US010419644B2

(12) United States Patent
Xu et al.

(10) Patent No.: US 10,419,644 B2
(45) Date of Patent: *Sep. 17, 2019

(54) DIGITAL IMAGE PROCESSING NETWORK

(71) Applicant: Sawgrass Technologies, Inc., Mt. Pleasant, SC (US)

(72) Inventors: Ming Xu, Malvern, PA (US); Nathan Hale, Mt. Pleasant, SC (US); Major Murphy, Simpsonville, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/125,920

(22) Filed: Sep. 10, 2018

(65) Prior Publication Data

US 2019/0020787 A1  Jan. 17, 2019

Related U.S. Application Data

(63) Continuation-in-part of application No. 15/678,807, filed on Aug. 16, 2017, now Pat. No. 10,075,619, (Continued)

(51) Int. Cl.
*B41J 3/407* (2006.01)
*H04N 1/54* (2006.01)
(Continued)

(52) U.S. Cl.
CPC .............. *H04N 1/54* (2013.01); *B41J 2/2054* (2013.01); *B41J 2/2128* (2013.01); *B41J 3/407* (2013.01);
(Continued)

(58) Field of Classification Search
CPC ......... H04N 1/54; B41J 2/2054; B41J 2/2128; B41J 3/407; B41M 7/009; B41M 5/0047; B41F 16/02
See application file for complete search history.

(56) References Cited

U.S. PATENT DOCUMENTS 3,844,806 A 10/1974 Wegmann
3,948,828 A  4/1976 Becker et al.
(Continued)

FOREIGN PATENT DOCUMENTS

AU  200051869  10/2000
CN    1157630   8/1997
(Continued)

OTHER PUBLICATIONS

Engeldrum, Peter G., Four Color Reproduction Theory for Dot Formed Imaging Systems, Journal of Imaging Technology, Apr. 1986, vol. 12, No. 2, Society of Photographic Scientists and Engineers.
(Continued)

*Primary Examiner* — Yaovi M Ameh
(74) *Attorney, Agent, or Firm* — B. Craig Killough; Barnwell Whaley Patterson & Helms, LLC

(57) ABSTRACT

In an imaging method an image or multiple images, an ink specification and substrate or substrates for imaging are selected. A central computing device (CCD) determines a volume of ink required to form the images and communicates with a plurality of printers that are geographically remote from the CCD. Each of the plurality of printers communicates to the CCD an ink specification available at the printer, a volume of ink available and optionally substrates that are available at the printer location. The CCD selects a printer or printers from the plurality of printers to fulfill the print job considering the geographic location of the printer(s), the ink specification available to the printer, and the volume of ink available at the printer. The CCD provides to the printer information and specifications which may include an image specification, an ink specification, a waveform specification and a substrate specification.

12 Claims, 16 Drawing Sheets

Related U.S. Application Data which is a continuation of application No. 15/136,019, filed on Apr. 22, 2016, now Pat. No. 9,781,307, which is a continuation-in-part of application No. 15/076,067, filed on Mar. 21, 2016, now abandoned, which is a continuation-in-part of application No. 14/541,844, filed on Nov. 14, 2014, now Pat. No. 9,302,468.

(60) Provisional application No. 62/249,668, filed on Nov. 2, 2015.

(51) Int. Cl.
  *B41M 7/00* (2006.01)
  *B41J 2/21* (2006.01)
  *B41J 2/205* (2006.01)
  *B41M 5/00* (2006.01)
  *B41F 16/02* (2006.01)

(52) U.S. Cl.
  CPC .......... *B41M 5/0047* (2013.01); *B41M 7/009* (2013.01); *B41F 16/02* (2013.01)

(56) References Cited

U.S. PATENT DOCUMENTS

| | | |
|---|---|---|
| 3,969,302 A | 7/1976 | Wegmann et al. |
| 3,977,828 A | 8/1976 | Becker et al. |
| 4,042,320 A | 8/1977 | Becker et al. |
| 4,042,545 A | 8/1977 | Defago et al. |
| 4,205,991 A | 6/1980 | Becker et al. |
| 4,207,067 A | 6/1980 | Becker |
| 4,265,630 A | 5/1981 | Bauerle |
| 4,265,631 A | 5/1981 | Becker |
| 4,281,999 A | 8/1981 | Becker et al. |
| 4,370,144 A | 1/1983 | Skelley et al. |
| 4,422,854 A | 12/1983 | Hahnle |
| 4,460,374 A | 7/1984 | Abel et al. |
| 4,550,324 A | 10/1985 | Tamaru et al. |
| 4,559,150 A | 12/1985 | Becker |
| 4,561,789 A | 12/1985 | Saito |
| 4,659,383 A | 4/1987 | Lin et al. |
| 4,689,078 A | 8/1987 | Koike et al. |
| 4,713,081 A | 12/1987 | Becker |
| 4,758,952 A | 7/1988 | Harris et al. |
| 4,820,346 A | 4/1989 | Nowak |
| 4,853,036 A | 8/1989 | Koike et al. |
| 4,969,951 A | 11/1990 | Koike et al. |
| 5,028,262 A | 7/1991 | Barlow |
| 5,041,161 A | 8/1991 | Cooke et al. |
| 5,065,167 A | 11/1991 | You et al. |
| 5,114,477 A | 5/1992 | Mort et al. |
| 5,164,232 A | 11/1992 | Henseleit et al. |
| 5,229,786 A | 7/1993 | Suga et al. |
| 5,250,121 A | 10/1993 | Yamamoto |
| 5,281,261 A | 1/1994 | Lin |
| 5,298,062 A | 3/1994 | Davies et al. |
| 5,350,446 A | 9/1994 | Lin et al. |
| 5,350,789 A | 9/1994 | Sagawa et al. |
| 5,372,852 A | 12/1994 | Titterington et al. |
| 5,385,957 A | 1/1995 | Tobias et al. |
| 5,421,868 A | 6/1995 | Ayalia-Esquilin et al. |
| 5,488,907 A | 2/1996 | Xu et al. |
| 5,592,204 A | 1/1997 | Lin et al. |
| 5,598,195 A | 1/1997 | Okamoto et al. |
| 5,601,023 A | 2/1997 | Hale et al. |
| 5,640,180 A | 6/1997 | Hale |
| 5,643,387 A | 7/1997 | Berhauser |
| 5,734,396 A | 3/1998 | Hale et al. |
| 5,746,816 A | 5/1998 | Xu et al. |
| 5,830,263 A | 11/1998 | Hale et al. |
| 6,197,409 B1 | 3/2001 | Bodager et al. |
| 6,284,004 B1 | 9/2001 | Burglin et al. |
| 6,286,923 B1 | 9/2001 | Sugahara |
| 6,428,134 B1 | 8/2002 | Clark et al. |
| 6,450,098 B1 | 9/2002 | Hale et al. |
| 6,540,345 B1 | 4/2003 | Wagner et al. |
| 6,674,539 B1 | 1/2004 | Serra et al. |
| RE38,952 E | 1/2006 | Hale et al. |
| 7,333,239 B2 * | 2/2008 | Oshikawa .......... H04N 1/00233 101/128.4 |
| 7,575,293 B2 | 8/2009 | Snyder |
| 7,654,660 B2 | 2/2010 | Hale et al. |
| 7,828,420 B2 | 11/2010 | Fagerquist et al. |
| 8,056,999 B2 | 11/2011 | Gardner et al. |
| 8,240,798 B2 | 8/2012 | Oshima et al. |
| 9,781,307 B2 * | 10/2017 | Xu .......... H04N 1/54 |
| 10,075,619 B2 * | 9/2018 | Xu .......... H04N 1/54 |
| 2001/0022596 A1 | 9/2001 | Korol |
| 2003/0146963 A1 | 8/2003 | Murray |
| 2003/0189609 A1 | 10/2003 | Ishikawa |
| 2008/0044587 A1 | 2/2008 | Maeno et al. |
| 2008/0246978 A1 | 10/2008 | Braveman et al. |
| 2011/0102491 A1 | 5/2011 | Kovacs et al. |
| 2013/0108285 A1 | 5/2013 | Spink et al. |
| 2015/0029552 A1 * | 1/2015 | Nishizawa .......... G06F 3/1253 358/1.15 |
| 2016/0042255 A1 | 2/2016 | Ganesh et al. |
| 2018/0007236 A1 | 1/2018 | Xu et al. |

FOREIGN PATENT DOCUMENTS

| | | |
|---|---|---|
| CN | 1608113 | 4/2005 |
| CN | 101248146 | 7/2012 |
| EP | 0525994 A1 | 2/1993 |
| EP | 0558914 | 9/1993 |
| EP | 0602885 A1 | 6/1994 |
| EP | 0622951 | 11/1994 |
| EP | 745651 A1 | 12/1996 |
| EP | 0912792 | 5/1999 |
| EP | 0893260 | 12/1999 |
| GB | 1527396 | 10/1978 |
| GB | 2189436 A | 10/1987 |
| JP | 5353414 | 5/1978 |
| JP | 60042317 | 3/1985 |
| JP | 61118477 | 6/1986 |
| JP | 6257750 | 3/1987 |
| JP | 02049070 | 2/1990 |
| JP | 02049071 | 2/1990 |
| JP | 02051566 | 2/1990 |
| JP | 02051567 | 2/1990 |
| JP | 03234772 | 10/1991 |
| JP | 05221154 | 8/1993 |
| JP | 06057656 | 3/1994 |
| JP | 2005281523 | 10/2005 |
| JP | 2008223193 | 9/2008 |
| WO | WO2002056191 | 7/2002 |
| WO | WO2007088154 | 8/2007 |

OTHER PUBLICATIONS

Symons, Pete, Digital Waveform Generation, Dec. 2013, Cambridge University Press, Cambridge 2014.

Green, Phil, Color Management Understanding and Using ICC Profiles, 2010, John Wiley & Sons, Ltd., West Sussex, United Kingdom.

Millman, Jacob and Taub, Herbert, Pulse, Digital, and Switching Waveforms Devices and Circuits for Their Generation and Processing, 1965, McGraw Hill, Inc., US.

* cited by examiner

Print File:    2d/3d Product Preview:

Blank Product:      Printed Medium:      Decorated Product:

DIGITAL IMAGE PROCESSING NETWORK

This application is a continuation in part of application Ser. No. 15/678,807, filed Aug. 16, 2017, which is a continuation of application Ser. No. 15/136,019, filed Apr. 22, 2016 and now U.S. Pat. No. 9,781,307, issued Oct. 3, 2017, which claims the benefit of Provisional Application Ser. No. 62/249,668, filed Nov. 2, 2015. This application is a continuation in part of application Ser. No. 15/678,807, filed Aug. 16, 2017, which is a Continuation in Part of application Ser. No. 15/076,067, filed Mar. 21, 2016, which is a Continuation in Part of U.S. Pat. No. 9,302,468, issued Apr. 5, 2016 and upon which Applicant claims priority.

FIELD OF THE INVENTION

This invention relates to digitally customizing objects by digital imaging, and is more specifically related to a digital customizing system and method employing digital techniques, heat activated colorants for digitally customizing and decorating objects in a networked environment.

BACKGROUND OF THE INVENTION

Digital technology allows mass customization of objects. High volumes of articles may be imaged ("mass"), with each article potentially having a different image ("customization"). Single articles or low volumes of objects may also be economically customized using digital printing methods.

Mass customization offers advantages over traditional mass production methods. Unlike traditional mass production process, mass customization provides fast changes between different designs, substrates, end products, printer settings, ink selection, etc. without having to manually change machinery or operational parameters. Due to the ever faster business cycle, customers prefer to receive finished goods with customized images using the fastest possible methods. Digital technology also allows automated mass customization of objects by using networked product design, processing and logistics handling.

SUMMARY OF THE PRESENT INVENTION

The present invention is a networked imaging method for digitally decorating or customizing objects typically formed of substrates other than paper. The system may include connected digital end-user devices such as computers, internet/web based online intelligent software for graphic design, image creation or modification and image metadata processing, at least one remote fulfillment process center with a printer server loaded with color management software, controlling at least one full color inkjet printer designed for printing heat activated ink, and an inventory/support center.

Digital printing according to the invention provides consistent imaging quality, even though printing takes place at multiple locations. The use of networking provides optimal control of printing parameters irrespective of the image and colors printed, environmental conditions, and substrate to be printed. Networking also reduces delivery time and cost of the imprinted article to the consumer.

A central computing device (CCD) determines a volume of ink required to form the images and communicates with a plurality of printers that are geographically remote from the CCD. Each of the plurality of printers communicates to the CCD an ink specification available at the printer, a volume of ink available and optionally substrates that are available at the printer location. The CCD selects a printer or printers from the plurality of printers to fulfill the print job considering the geographic location of the printer(s), the ink specification available to the printer, and the volume of ink available at the printer. The CCD provides to the printer information and specifications which may include an image specification, an ink specification, a waveform specification and a substrate specification.

DETAILED DESCRIPTION OF PREFERRED EMBODIMENTS

Figure 1:
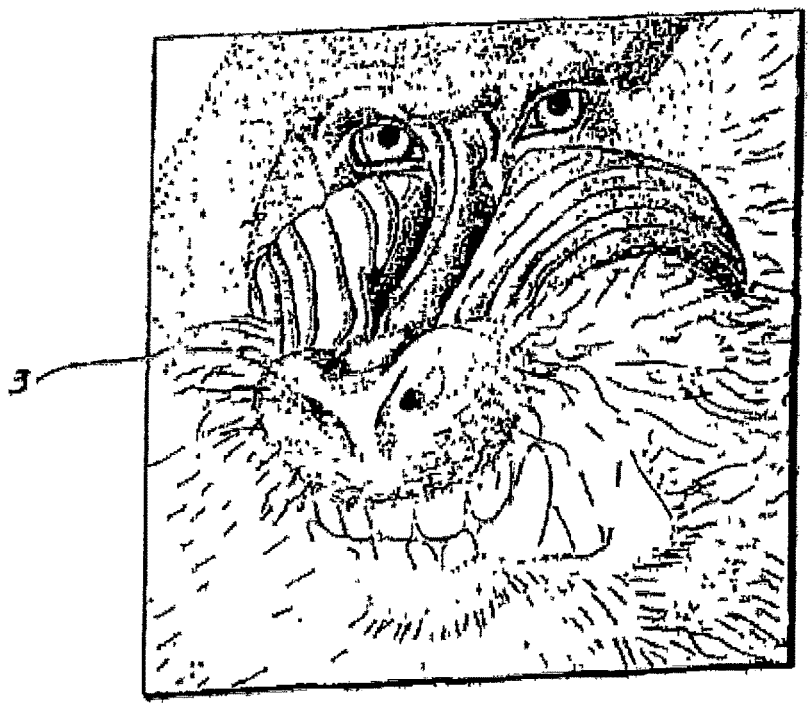
FIG. 1 illustrates an example of a design printed by a printer using the printing process.
Figure 2:
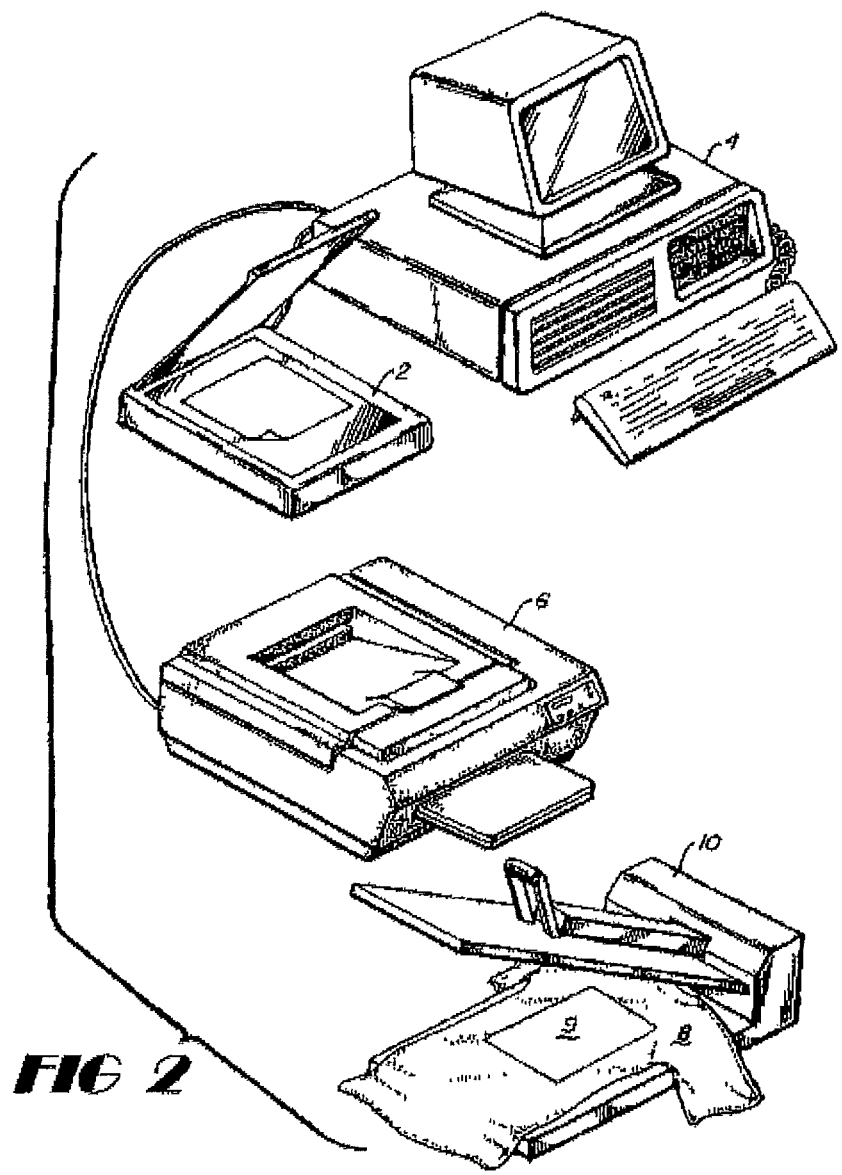
FIG. 2 is a diagrammatic illustration showing exemplary elements of computer and printing systems which could be used to achieve the printing process.
Figure 3:
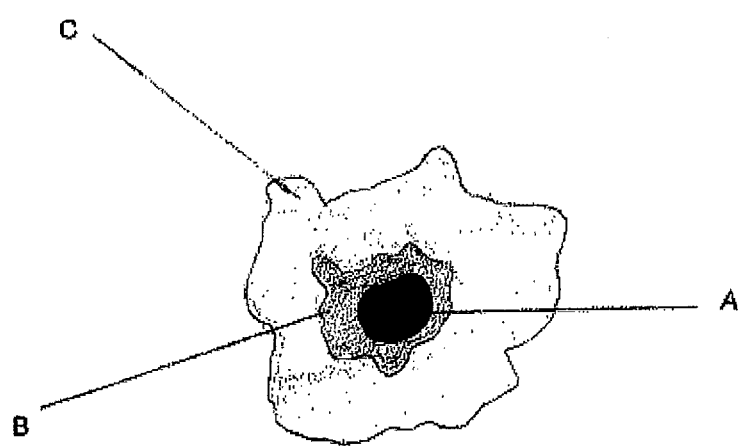
FIG. 3 demonstrates dot gain upon printing and additional dot gain after heat activation of the colorant.

A digital image is created using a computer 4, or a digital image is supplied to the computer. The computer directs a printer 6 to print the digital image. Any means of forming a digital image that may be printed from a computer may be used. For example, computer design graphic software may be used, or photography may be used. As shown in FIG. 2, the design may be read by a scanner 2 and the design communicated to a computer 4. The design may be photographic, graphic, artistic, or simply letters or words. The use of cyan, yellow and magenta, and optionally, black ink compositions allow the printer to print in full color or multi-color designs.

The printer prints the image 3 onto a medium 9, which may be paper. After the image is printed onto the medium, the image is positioned against the final or receiver substrate

8, and activated by the application of heat and pressure from a heat supply 10. The image is permanently transferred from the medium to the final or receiver substrate by the application of heat and pressure. For example, the image may be transferred onto a textile substrate, such as a shirt 8, although the image may be transferred onto other materials as a final substrate, such as metal, ceramic, wood, or plastic. The design 3, which is printed onto the medium 9 without activating the ink, is placed against the final substrate which may be a shirt 8. A temperature which is sufficient to activate the dye is applied by a heat supply such as a heat press. This temperature will typically be about 200 degrees Celsius. This temperature is applied for a time sufficient to heat activate and transfer the ink solids in accordance with the requirements of the invention.

A heat supply such as heat transfer press 10 may be used to accomplish transfer of the inks from the medium to the substrate. In the embodiment described, activation, or sublimation, of the dye or colorant does not take place at the time of printing the image onto the medium, but occurs during the transfer from the medium to the substrate. In another embodiment, the image is printed onto the final or receiver substrate, and the colorant is heat activated after printing by the application of heat to the image.

The process described herein allows custom decoration of small or large quantities of objects ranging from clothing to housewares to personal items formed of substrates that have an affinity for the heat activated colorants used with the process, either through remote or local access. The process permits different images to be printed in uninterrupted succession by the printer. Objects formed of different substrates may be imaged from the printed media, also in succession. For example, the printer can print a series of images, a, b, c, d . . . x, y, z, in succession, wherein each of the images is different from the other. Each of the images printed on the media is printed to specifications that yield optimal quality on a specific substrate for which the image is intended. For example, image a may be intended for a textile substrate; image b for a different textile composition from image a; image c intended for a ceramic, image d for a ceramic of curved shape; image e for a wood substrate and image f for a metal substrate. To obtain optimal quality, such as photographic quality, the characteristics of the printed image, as well as the image itself, must be adapted to the substrate. Factors such as two levels of dot gain and other factors must be considered, and the performance of the printer changed for each image, as described herein for developing a data matrix. At the same time, especially by using a computer driving multiple printers, this process of custom decoration of objects can be achieved on a commercial production basis using various size printers developed for the process.

Though printers employing different technologies may be used within the network, the printer preferred to be used with the present invention is a full color piezoelectric drop-on-demand inkjet printer that will image a substrate, including paper substrates. The full color digital printer selected by the for a job may depend on the ability of the printer to accomplish the job requirements. Variables such as image resolution, ink volume and color requirements, and dimensions of the desired image and substrate to be imaged. The selected printer is able to achieve consistent imaging quality.

Printing involving colorants that are activated or transferred by heat is sensitive to ink types, environmental and other operating parameters, and material substrates. Final image quality, such as color quality and resolution, depends on factors that include substrate dimensions and shape, substrate composition, surface conditions and absorptiveness, and ink or colorant types. Different substrates may require different heat activation inks or colorants, printing, fixing or transfer parameters in order to achieve better outcomes in both quality and longevity.

The term "dot gain" is used to describe the enlargement of printed ink dots from their intended dimensions. In non-heat activated printing techniques, dot gain is due to ink migration from mechanical impact when ink droplets hit the substrate and the interaction between the ink and the substrate. However, in heat activated imaging processes dot gains are produced by both the printing process and by subsequent heat activation, both of which critically impact the final image quality. Typically, correction of dot gain requires experienced operators who manual tweak ink usage, a method that often lacks accuracy and consistency.

Inkjet printing with aqueous (water based) inks comprising heat activatable colorants results in dot gain. Dot gain materially impacts image quality. First, when ink is printed using a 150 lpi (line per inch) resolution onto a substrate, which may be the intermediate substrate 9, the printed ink dot may gain 5 to 10% in size at a midtone area of an image. The ink dot gain may be due to mechanical impact or on printer heating, liquid migration of the ink on the media by gravity or capillary forces, or by rimming, or by spreading/wetting behavior, such as a surface/interfacial energy value difference between the substrate and the liquid ink.

Additional, or second level, dot gain occurs when inks comprising heat activatable colorants are used. Second level dot gain results from heat activation of the colorants. The level of energy applied to the printed image, primarily in the form of heat, is typically much higher than energy applied during the process of printing the image onto the substrate by the printer. Depending on the properties of the ink, the substrate, the heat activating parameter, and the ink droplet size, second level dot gain may be as high as several hundred percent when compared to dot gain experienced during the printing step.

Figure 4:
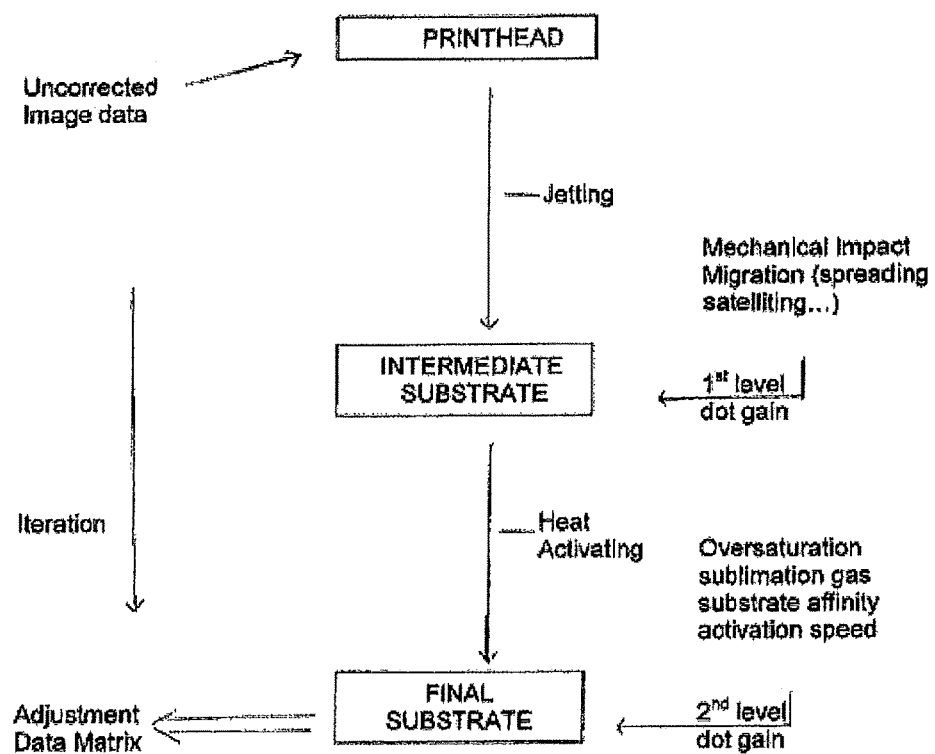
FIG. 4 is a flow chart indicating dot gain factors during the printing process.

FIG. 4 demonstrates the two levels of dot gain. The intended image dot size (A), upon printing on the intermediate substrate, may diffuse and increase to size (B). Upon heat activation, the dot size (C) is further increased on the final substrate. Two levels of dot gain, where the second level is the product of heat activation, is not encountered in simply printing an image on paper by means of a desk top size inkjet printer.

Dot gain, and particularly second level dot gain, must be controlled in order to obtain high definition, high-resolution image with faithful reproduction of photographic images when using heat activatable colorants. This is especially important in generating color images having a half tone area, or having fine details, where small and discrete ink dots are required for both physical resolution and color resolution. In addition, the magnitude of dot gain resulting from the energy activation process cannot be satisfactorily corrected or controlled by conventional methods, such as graphic application software, or color management/profiling tools, in order to achieve high resolution quality. High resolution printing techniques that are successful in conventional printing with small printers, using water soluble dyes printed on paper, are not satisfactory when using aqueous inks comprising heat activatable dyes or colorants that are insoluble, or sparingly soluble, in water. Such techniques tend to achieve only a fraction of the desired resolution in applications when the second level of dot gain is not considered, or is inadequately considered, as has been the case with the use of prior art printers and printing processes using liquid ink comprising heat activatable dyes or colorants. Conventional printers and print techniques have not adequately considered inkjet droplet formation for aqueous inks comprising heat activatable colorants.

Figure 6:
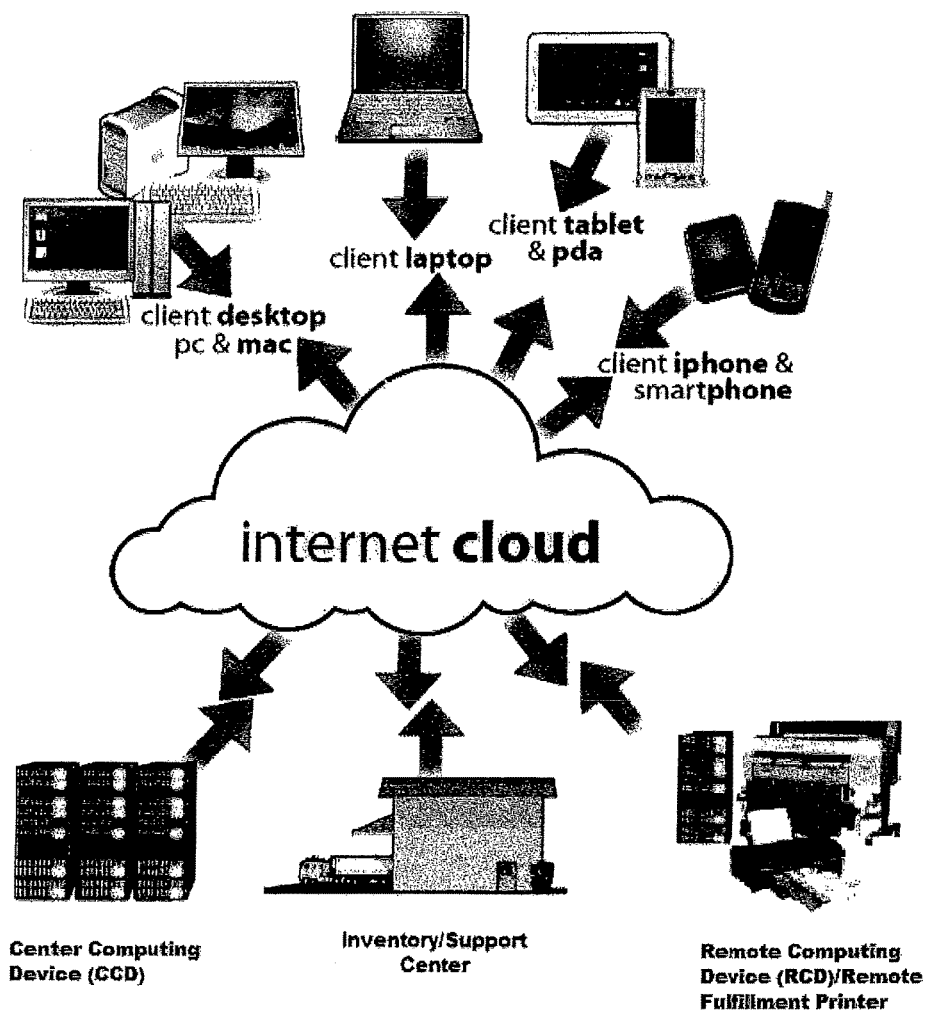
FIG. 6 depicts an automated network system including various components.

In one embodiment, a mass customization system and method of imaging is employed. A web/internet or cloud based server provides end users with an interface for customized image design and product order processing, an internet or cloud linked a CCD, and an internet or cloud linked inventory and order support center for supporting activities. FIG. 6. Dot gain levels, and especially dot gain as it relates to heat activation of imaging materials such as inks, are preferred to be considered and controlled from initiation of the process through completion of the process.

A web/internet or cloud based server, which may be designated as a CCD, may be connected to the internet and linked to multiple client devices. A client device is a digital device that is capable of connecting with and communicating with a network, and is preferred to be able to download, modify and transmit digital images. The device is preferred to be able to accomplish customized ordering, typically using network interface tools, which may be provided by the operator of the CCD to the client. Examples include independent computers, tablets, PDAs, smart phones and the like. The invention comprises at least one remote fulfillment process center where a remote computing device (RCD) resides, and at least one Inventory/Support center. Products that are imaged by the heat activated imaging method may be directly and intelligently graphically designed, modified, and ordered from remotely situated client devices.

The internet or cloud based CCD is a computation server that provides tools and database(s). The CCD may comprise multiple markup language interfaces and protocols that enable various end user or client devices to access the CCD. These user devices include, but are not limited to, desktop computers, laptop computers, tablets/phablets, smartphones or personal digital assistant (PDA) devices, which may be of various operating systems. The computation server may provide graphic customer design tools that can be accessed and operated from the user devices, allowing on-device quick design and product ordering, and eliminating the need for a user to own expensive graphics design software.

Figure 7A:
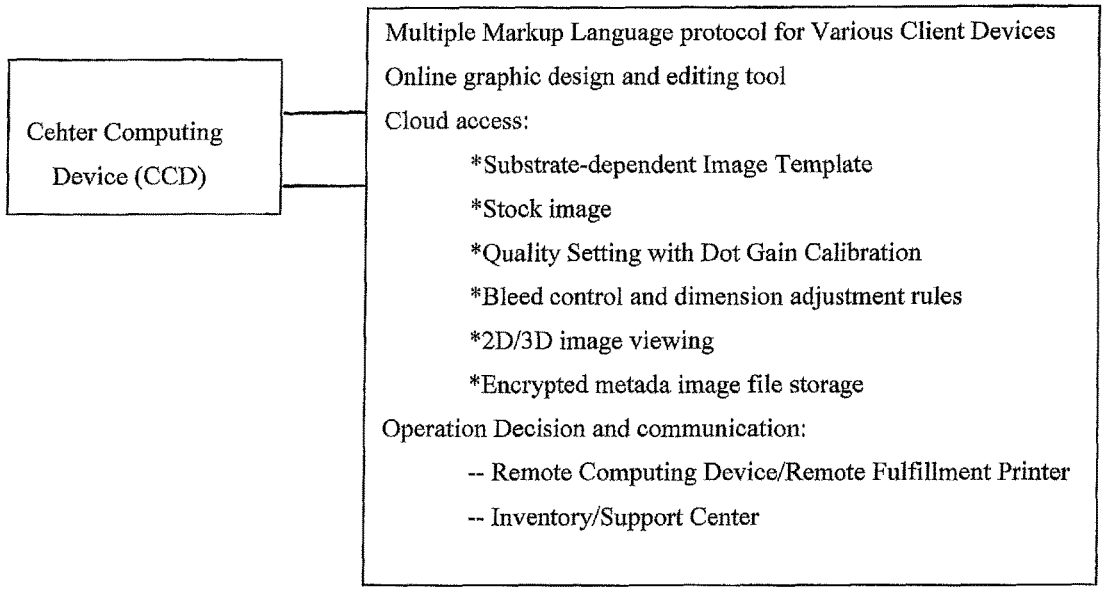
FIG. 7a indicates data communicated to and from the Central Computing Device by a web/internet or cloud based server.

FIG. 7a demonstrates other components of the server that assist the customization process. These components include, but are not limited to: substrate-dependent image templates, stock images (and/or text fonts), quality or resolution (due to dot gain, etc.) components, bleed control and dimensional adjustment rules, 2D or 3D image viewing of intended image objects with color accuracy calibrated for the device, metadata encryption or encoding for secure transporting through the internet/cloud, and finished metadata storage and queuing communications.

In order to faithfully produce a customized image on a selected substrate two levels of dot gain correction are embedded in the design. This is especially important when sharp and crisp edges of an image are required on a hard, non-absorptive substrate. Depending on the selection of the substrate, dot gain correction not only eliminates heat activation imaging process quality distortion, but also ensures that what the user views from on an output device, such as a web browser, is consistent with the finished product, both with regard to color accuracy and reproduction of fine detail of the image. Depending upon the substrate, ink, process parameters, and/or other specific needs or requirements selected, instructions may be given to a remote fulfillment process computing device (RCD) for matching printing parameters such as printhead waveform, piezo pulse frequency, driving force (voltage) or pressure, ink droplet size (grey scale), heat fixing of the image or other transfer process parameters.

Many substrates used for imaging by heat activation of inks or colorants require surface treatment, such as coating the substrate with synthetic materials. For instance, ceramic materials are coated with polyester or polyurethane to provide effective reception of heat activatable images. Natural fibers and many textile substrates require similar treatment to achieve vivid colors upon heat activation to permanently bond colorants to the substrate. Heat activation may be limited by the shape and size of heat fixing or transfer equipment, such as a heat press. Only the areas of the substrate that are within the dimensions of the heat press (or other types of heat activation equipment) are imaged successfully.

The web server CCD software provides an intelligent application that is available to a remote user having minimal local design tools. The data base of the server contains detailed substrate information. Areas of the substrate that are available for imaging, and the image dimension/shape are selected from the client device, and are automatically adjusted to ensure proper coverage of the final, image receiving substrate, without leaving undesirable void or blank areas. This feature is referred to as the "Bleed Control Rule."

The Bleed Control Rule of the CCD software may be applied when the final, image receiving substrate is dimensionally smaller than the dimension of the heat press or other heat activation treatment equipment. An image will be enlarged, or occasionally, shrunk proportionally along both planar sides to provide a borderless imaging of the object. The Bleed Control Rule may prevent inconsistent borders on the object, achieving a superior aesthetic result, while covering the entirety of the object. This technique is especially useful when the object to be imaged is small, and coverage of the entire imagable area of the object is desirable.

The web server CCD intelligence software may adjust printing resolution based upon the selected substrate to be imaged. For example, a 75 line-per-inch loose weave textile substrate requires printing resolution that is generally no higher than 150 dots-per-inch. A higher resolution will not achieve higher image quality for loose weave textiles, but will consume more ink and require a longer printing time. On the other hand, a coated metallic substrate may be able to receive the highest possible photographic image quality a printer can provide. Lookup tables of various substrates may be employed by the intelligence software that corresponds to efficient printing resolutions.

Figure 7B:
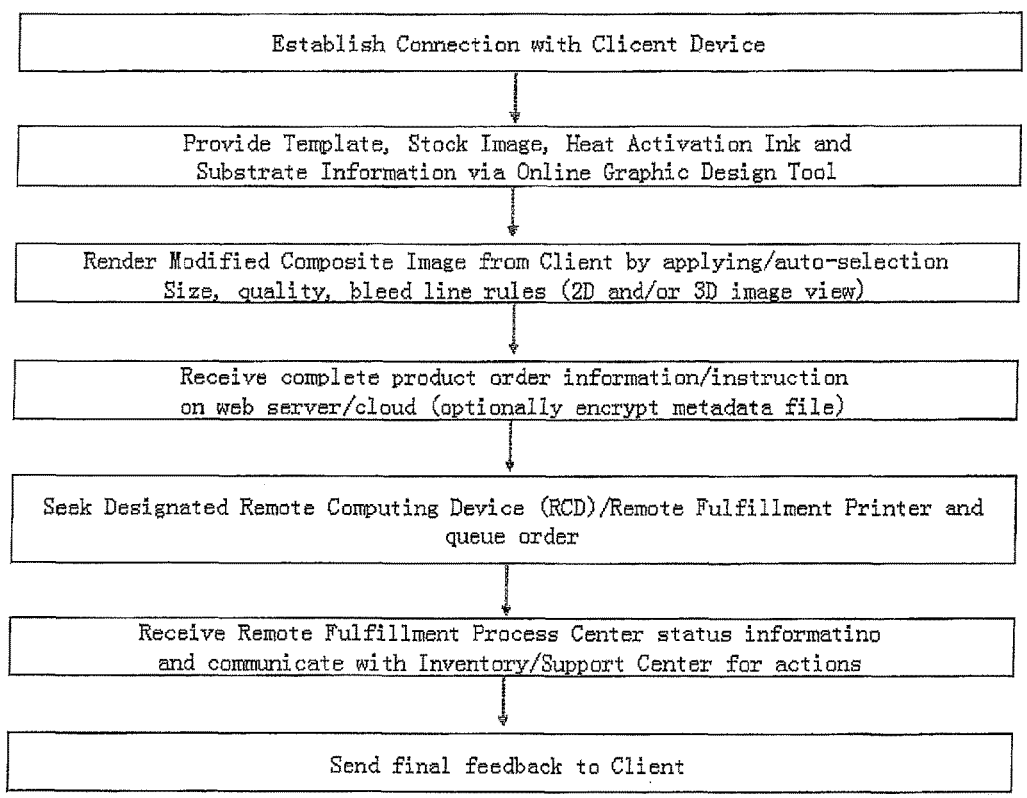
FIG. 7b is a block diagram of an example workflow of a networked order function.

FIG. 7b depicts an example of a workflow process employing software that may be available to the CCD. Upon establishing a connection between the CCD and a client device, using a web browser, a substrate to be imaged is selected. A local image that resides on, or is locally provided to, the user device may be loaded into the template for tweaking, overlaying, and/or dimensional adjustment of the image. Alternatively, an image retrieved from the stock image collection of the CCD may be used. Color selection, shape and intensity, and the addition of text with various fonts and artistic effects may be used to provide a final composite image suitable for imaging the substrate. Quality/resolution, based on substrate selection and dot gain information, and Bleed Control Rules may then be applied as options, followed by a 2 or 3 dimensional review on the device. A work-in-progress file may be temporarily saved or added on the HADIMC/cloud, and sent to the customer or client device for approval or further editing through a virtual realistic look prior to final composite image storage on the HADIMC. After the user is satisfied with the design or modification, other relevant information may be added to fulfill the final product order request. This information may include, but is not limited to: number of items to be imaged, date and/or time of delivery, and a preferred location for pick up or shipment. A metadata file comprising this information is saved on the CCD server or cloud for operational purposes. The CCD software automatically (or manually, if desired) seeks an appropriate remote fulfillment process center for fulfillment of the customer's/user's order. This information is displayed or printed for documenting the operation at the corresponding processing center.

The web server CCD software also monitors the status of each remote fulfillment process center to monitor inventory (substrates, intermediate media, ink, hardware, and supplies) and/or service needs or abilities. Feedback related to customization production, such as cost, date/time-to-deliver, shipping and handling, etc. may be sent to the client device or other designated location through the CCD.

Figure 8A:
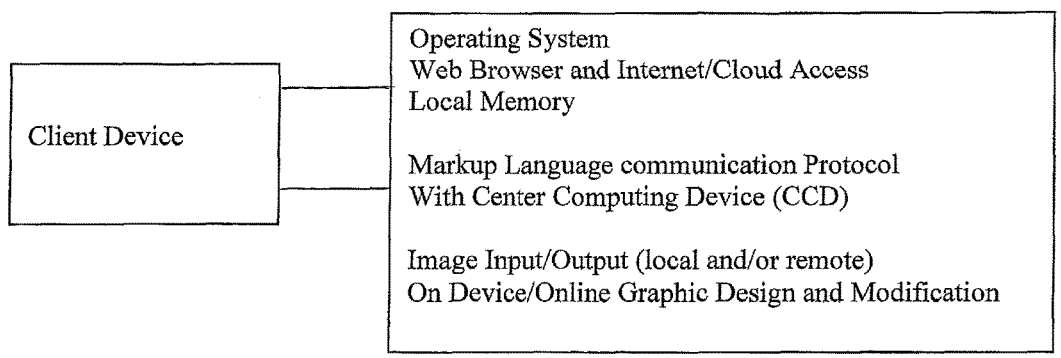
FIG. 8a shows functionality of a Client Device.
Figure 8B:
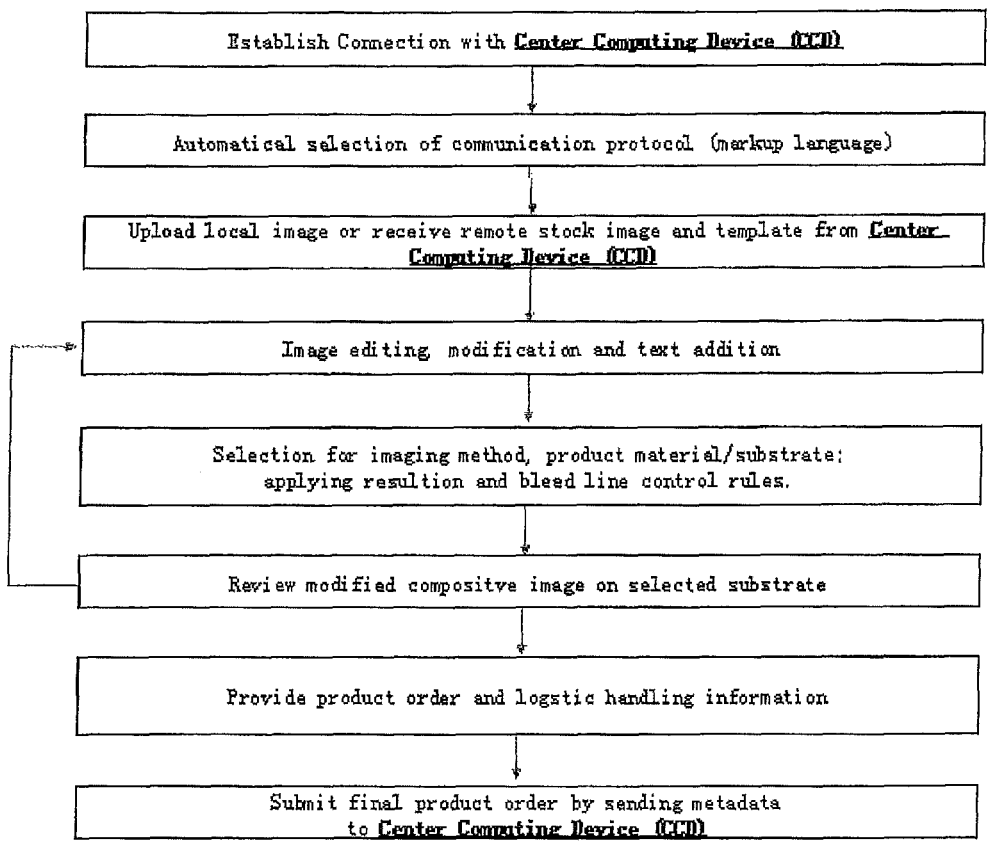
FIG. 8b is a block diagram of Client Device facilitating graphic design tools, image and substrate information, processing order through central computing device.

FIG. 8a illustrates functions and FIG. 8b shows workflow processes at the client device. After connection with web server CCD, an automatic selection of program language protocol, such as hypertext markup language, is selected by the user interface for the device browser to engage in tasks required to fulfill the customized design and product ordering process. Depending upon the complexity of the operation, and/or the internet connection speed, either local device memory or memory blocks on the CCD may be used for temporary working image file storage, and for convenience in the event of further modification. This combination of using both the cloud and the user's local device RAM or temporary memory gives a quick and fluid user experience. Final metadata files, such as the composite image(s) for the job, substrate/product choices, shipping and handling information, printer capabilities, ink volume requirements for the job, ink volume availability and ink related information is preferred to be encoded or encrypted and saved at the CCD location for execution of order fulfillment.

Though both vector and bitmap image types may be used, image files of various formats may be loaded to the online graphic design/modification interface of the present invention, including TIFF/TIF, PNG, JPEG/JPG, GIF, etc. High quality image file types such as PNG with both grayscale and RGB color features, 8 bit color quality or better, and with a transparency option for further modification, are preferred. Lossless compression of images during internet transmission is also desirable. Preferred final (ready-to-print) and fully rendered composite image file types include PNG and PDF.

Figure 8C:
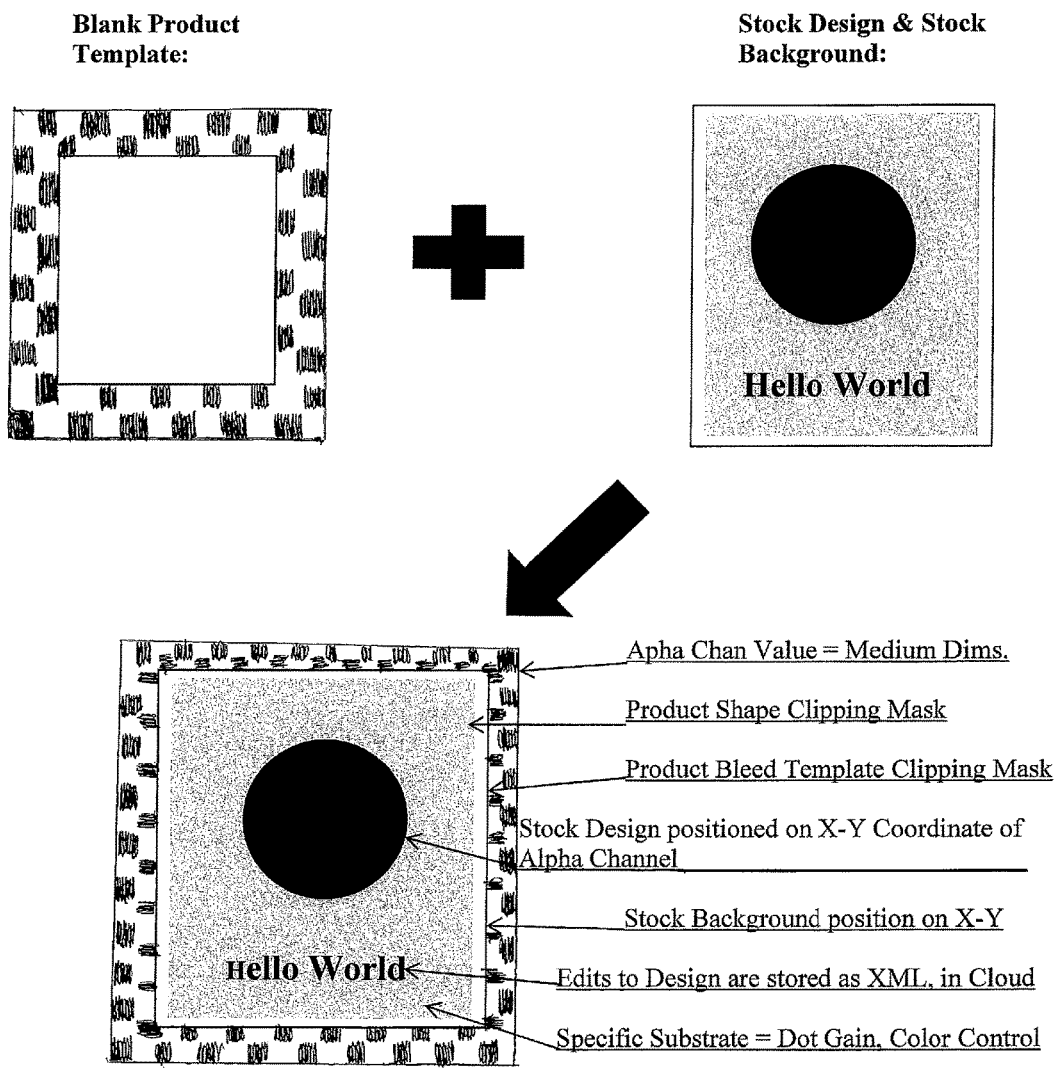
FIG. 8c demonstrates a graphic design and manipulation process according to an embodiment of the invention.
Figure 8D:
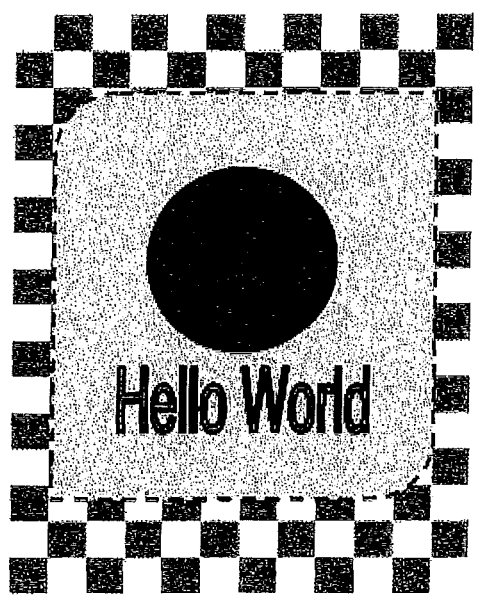
FIG. 8d demonstrates an image design and viewing process using product template according to the invention.
Figure 8D:
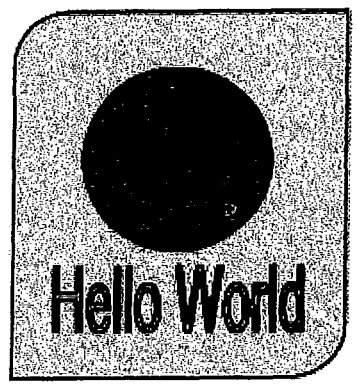

In an embodiment of the invention, at the client device browser, a blank product template with a background is first provided by the webserver (CCD), including template size (medium size), and product/substrate shape (FIG. 8c). A photographic image, either uploaded from the local client device browser or from a stock image database at the CCD, is placed onto a blank canvas or inserted into a template's existing canvas for the creation of a design. The design may comprise image content, and may include text with desired alpha channel values, or both. A "canvas" as used in this embodiment is a two dimensional plane, with specific pixel width and pixel height, having multiple-layers onto which the user positions raster images and vector objects, including text and/or images. These layers are stacked atop one another. The alpha channel value, or alpha value, of a pixel, in addition to RGB values, on a layer determines the transparency, or the degree of visibility to lower layers. For example, the layer ordering determines whether added text is visible in front of an image or hidden behind. The canvas is precisely sized and dimensioned for the printing medium (or intermediate medium), which endures the image scaling properly during the printing process. Program subroutines from either or both sides of CCD and client browser are used to edit the image design, including Text, that is to appear with the image. The combination of the Alpha Channel values, plus the X-Y coordinates determine where on the medium the image and the text will be placed in different overlapping layers. A product may have a unique shape (Product Clipping Mask), and a slightly larger Bleed Clipping Mask (bleed control rule application) may be used to allow for full bleed printing ("edge-to-edge" or borderless printing). Upon previewing and confirming (FIG. 8d), a fully rendered composite image viewed as a fully trimmed realistic image on the selected substrate may be saved as a printing file, with parameters used to optimize the product. Such parameters include printing resolution, spot color replacement/independent ink channel control, two levels of dot gain calibration and adjustment, color management through linearization, ink limiting, ICC profile correction, and/or waveform selection, etc. to best suit various product substrates such as ceramic, wood, plastic/polymer resinous composite, metal, or fabrics.

Information regarding other operational or processing aspects of the customer's order may be added as metadata to the printing file prior to queuing into the webserver/cloud, or being sent to a corresponding remote fulfillment process center. A quantity of each ordered product, delivery time, shipping/handling instructions, or pick up time/location may be information provided as part of the order process.

The web based graphic design software accessed via a client device allows the device user to retrieve saved images for further modification, or for future applications, during subsequent user sessions. Customer identification and/or customer order identification may be used for the purpose of session continuation and/or future design and order processes. A user may be enabled to use different devices for different working sessions, as long as program communication protocols can be established between CCD and client devices.

A markup language (including scripting language) may be used to produce a user interface (UI) facilitating communication between CCD and the client device for purposes that include image editing/modification. Examples of markup languages include HTML/HTML5, XTML, WML (for wireless devices), and Javascript/JSON. Combinations of various markup languages may be used when necessary to enrich the functionality especially graphic design and modification operations. On the other hand, different types of server-side scripting may be used by the web server (CCD), including PHP, ASP.NET/ASP.NET MVC, WebForms, etc., to generate the markup language content that is delivered to the client's browser to render the user interface (UI).

The following is an example of a segment of the markup program language applied at CCD through client user interface (UI) providing five different substrates available for selection. Once selected, other corresponding information may be determined and to be saved in the metadata content.

GET https://webserver.company.com/api/substrate/list
JSON Response:

```
{
    "Data": [
    "Substrates": [
    "Mug",
    "T-Shirt", "Metal Sign", "Sweatshirt", "Jersey"
    ],
    "Success": true,
    "Errors": [ ]
    }
```

Other information may be treated similarly, and may or may not be transparent to the client, such as dimensions, available shipping carriers, and the like. Information associated with the job processed at CCD, but which is not transparent to the client may include operating parameters, dot gain lookup table calculation results, printhead waveform selection commands, etc.

In a process of mass customization imaging according to an embodiment of the invention, a large number of printing jobs may be dispatched for automatic operation from a CCD to a number of individual remote locations, either directly, or through one or a plurality of remote computing devices (RCD). To maintain high quality of printed images, factory sealed and non-refillable or one-time use ink cartridges, reservoirs, or containers, are preferred in order to prevent contamination from the environment. Further, uninterrupted printing operations achieve efficient ink and/or media/substrate usage. This goal may be facilitated by continuous printing operations to achieve desired performance by employing a consistent printing speed, using consistent media advancement, using the same ink batch for the entire job, and employing other printing related variables that improve quality and efficiency. For example, a print job for an image that is two-meters in length and printed on roll-fed media may waste printing ink and/or media if the job is interrupted for ink replacement or change, media replacement, and the like. Changing an ink cartridge or container before completion of printing of the image may result in air being introduced into the system, requiring printhead cleaning, and inkjet nozzle examination, interrupting the ongoing production printing job. Another example is a multiple-page print job with variable data components. Uninterrupted printing reduces the likelihood of even small print quality differences among imaged pages. The present invention utilizes safeguards to prevent unnecessary interruptions to resupply ink.

Printers used in networking based printing according to this embodiment may comprise ink sensors at the remote printers. The ink sensor may be incorporated into the ink cartridge or container, and is otherwise independent of the printer. Alternatively, the ink sensor may be incorporated into the printer hardware, and may reset or be resettable each time a fresh ink cartridge or container is installed or refilled. The ink sensor is in electronic communication with the CCD. An essential mechanism of the ink sensor is detection of the exhaustion of available ink in the cartridge or container, thereby preventing so-called "dry firing" of the printhead. Dry firing may be detrimental to the life of the printhead. Preferably, the ink sensor detects the amount of existing ink for each specific color of ink by cartridge or container, and communicates the information to the CCD, with or without going through any RCD in use.

The preferred ink sensor may detect physical properties of a liquid ink, such as weight, optical density, pH value, electrical conductivity, oxygen or air amount, pressure in the ink cartridge or container, and/or other properties with indication of the change of status in terms of printing ink in the cartridge or container. These physical properties may be converted to electronic signals that are transmitted to, for example, a printer controller memory, the RCD and/or CCD. A plurality of sensors may be used to enhance detection capabilities. Various different mechanical adapters or housings, and communication protocols may be used to host and/or connect ink sensors to networked printers and to the RCD server and/or CCD in real time. Memory chips may communicate detailed information about available ink such as batch numbers, color identification codes, expiration dates, ink volume, encryption codes, serial numbers, etc.

In one embodiment of the invention, the CCD further comprises a processing module that calculates quantitatively the ink volume requirement for each color of the to-be-dispatched print job. The ink volume may be determined by either a volume of ink or ink droplet count to be jetted via printhead nozzles. The data derived from the calculation is added to the metadata file that defines the specific print job.

An image data file may be converted after the raster process through a Raster Image Processor from user raster data (RGB/CMYK) to print-ready data (RPSC, PCL, or PostScript) to obtain ink usage calculation in terms of volume or weight. For example, a particular image consists a finite and known number of pixels to be dispatched and printed by an eight-channel printer. After the color processing, one pixel might comprise 12% Cyan, 22% Magenta, 8% Yellow, 6% Black (K), 12% Light Magenta, 15% Light Cyan, 26% of Florescent Yellow and 45% Florescent Magenta. A complete discharge (100%) of each color uses 20 pl (picoliter) of ink. An entire single pixel consumes 2.40 pl of Cyan ink, 4.40 pl of Magenta ink, 1.60 pl of Yellow ink, and so forth, with total ink consumption of 29.2 pl according to the example.

In addition to determining image size, image intensity, ink specifications, dithering, number of printing passes, and the number images to be printed, total ink consumption for each printing job is determined. A remote location printer capable of fulfilling the print job is selected. This determination consider jetting efficiency (impacted by the attrition of the printhead), total printing time, priming frequency, ink evaporating speed at local environment (temperature/humidity, etc.), as well as cleaning frequency during printing and/or during any standby period. Jetting efficiency and/or behavior may differ for different ink specifications. For instance, jetting aqueous based ink with low viscosity, low specific gravity or density may be very different from a radiation curable high viscosity, high specific gravity or density ink. Therefore, each printer may have a unique ink consumption profile that is different from any other printers at any given ink set, season or location within the network. Such a profile may be developed by the CCD through iterations of different print jobs to provide improved calculation accuracy. This information may be applied to future print jobs in determining printer selection. The information may be embedded in each metadata file with other print job related information such as color correction, waveform selection, dot-gain control and correction, substrate selection profile, and the like.

Digital printers use electronic pulse signals. A series of pulses generate a 'wave' to cause discharges of ink droplets or particulates to form color images on media or substrates. Image pixels carrying color and optical density (color strength) messages may be converted into pulse signals at nozzles of printheads through different color channels. The pixels may be differentiated by shape, strength and/or length. These pulses may be recorded by a printer controller memory and collected accurately by either or both of the remote and CCD and converted into weight or volumetric information for each color of inks required for a print job. The information may be combined into ink consumption profiles for designated printers in the network. Depending upon the printer and the printer firmware, different protocols may communicate between a printer and the RCD which is networked with CCD, or directly from the printer to the CCD. Trivial File Transfer Protocol (TFTP) Internet software utility and Simple Network Management Protocol (SNMP) Internet standard protocol are among the preferred communication methods.

The follow is an example of software structure useful in facilitating uninterrupted printing based on an eight-channel printer configuration:

```
float picoliterInkUsageConstant = 20;
float totalPicoLitersMagentaRequired = 0;
float totalPicoLitersCyanRequired = 0;
float totalPicoLitersBlackRequired = 0;
float totalPicoLitersYellowRequired = 0;
float totalPicoLitersLightMagentaRequired = 0;
float totalPicoLitersLightCyanRequired = 0;
float totalPicoLitersFluoPinkRequired = 0;
float totalPicoLitersFluoYellowRequired = 0;
for each (image in job){
for each (pixel in image)
    totalPicoLitersMagentaRequired = totalPicoLitersMagentaRequired + pixel[Magenta]
*picoliterInkUsageConstant;
    totalPicoLitersCyanRequired = totalPicoLitersCyanRequired + pixel[Cyan]
*picoliterInkUsageConstant;
    totalPicoLitersBlackRequired = totalPicoLitersBlackRequired + pixel[Black]
*picoliterInkUsageConstant;
    totalPicoLitersYellowRequired = totalPicoLitersYellowRequired + pixel[Yellow]
*picoliterInkUsageConstant;
    totalPicoLitersLightMagentaRequired = totalPicoLitersLightMagentaRequired +
pixel[LightMagenta] * picoliterInkUsageConstant;
    totalPicoLitersLightCyanRequired = totalPicoLitersLightCyanRequired +
pixel[LightCyan] *picoliterInkUsageConstant;
    totalPicoLitersFluoPinkRequired = totalPicoLitersFluoPinkRequired +
pixel[FluoPink] *picoliterInkUsageConstant;
    totalPicoLitersFluoYellowRequired = totalPicoLitersFluoYellowRequired +
pixel[FluoYellow] *picoliterInkUsageConstant;
}
}
for each (printer)
{
float picoLitersOfMagentaInPrinter = Query(printer, MAGENTA_INK_REMAINING);
float picoLitersOfCyanInPrinter = Query(printer, CYAN_INK_REMAINING);
float picoLitersOfBlackInPrinter = Query(printer, BLACK_INK_REMAINING);
float picoLitersOfYellowInPrinter = Query(printer, YELLOW_INK_REMAINING);
float picoLitersOfLightMagentaInPrinter = Query(printer, LIGHT_MAGENTA_INK_REMAINING);
float picoLitersOfLightCyanInPrinter = Query(printer, LIGHT_CYAN_INK_REMAINING);
float picoLitersOfFluoPinkInPrinter = Query(printer, FLUO_PINK_INK_REMAINING);
float picoLitersOfFluoYellowInPrinter = Query(printer, FLUO_YELLOW_INK_REMAINING);
boolean sufficientInkToPrintJob = true;
if(totalPicoLitersMagentaRequired < picoLitersOfMagentaInPrinter)
sufficientInkToPrintJob = false;
else if(totalPicoLitersCyanRequired < picoLitersOfCyanInPrinter)
sufficientInkToPrintJob = false;
else if(totalPicoLitersBlackRequired < picoLitersOfBlackInPrinter)
sufficientInkToPrintJob = false;
else if(totalPicoLitersYellowRequired < picoLitersOfYellowInPrinter)
sufficientInkToPrintJob = false;
else if(totalPicoLitersLightMagentaRequired < picoLitersOfLightMagentaInPrinter)
sufficientInkToPrintJob = false;
else if(totalPicoLitersLightCyanRequired < picoLitersOfLightCyanInPrinter)
sufficientInkToPrintJob = false;
else if(totalPicoLitersFluoPinkRequired < picoLitersOfFluoPinkInPrinter)
sufficientInkToPrintJob = false;
else if(totalPicoLitersFluoYellowRequired < picoLitersOfFluoYellowInPrinter)
sufficientInkToPrintJob = false;
if(sufficientInkToPrintJob)
{
Send(printer, job);
Exit;
```

If the local printer ink sensor indicates ink depletion but is not capable of detecting and/or communicating a precise ink quantity in each cartridge or containers, an Ink Level Module (ILM) at the computing device may be employed, preferably at the CCD, to monitor or calculate the real-time existing volume of ink of each color in the cartridges or containers of each connected printer. The determination of ink volume is based on the known starting ink amount (ink "full" status), ink usage history, standby history, and other factors impacting ink consumption by the printer. This (ILM) volume determination is on printhead jetting activity of each printhead, as well as the printer profile defined by the specifications and history of the applicable printer. In order to maintain a 'ready-to-use' status, printers in standby status may also consume ink for priming to preserve a useful meniscus status for each ink nozzle. Extra priming or cleaning may be needed after a long standby, or even after a power-off period. Changes are monitored and calibrated by the ILM at the CCD.

Figure 9A:
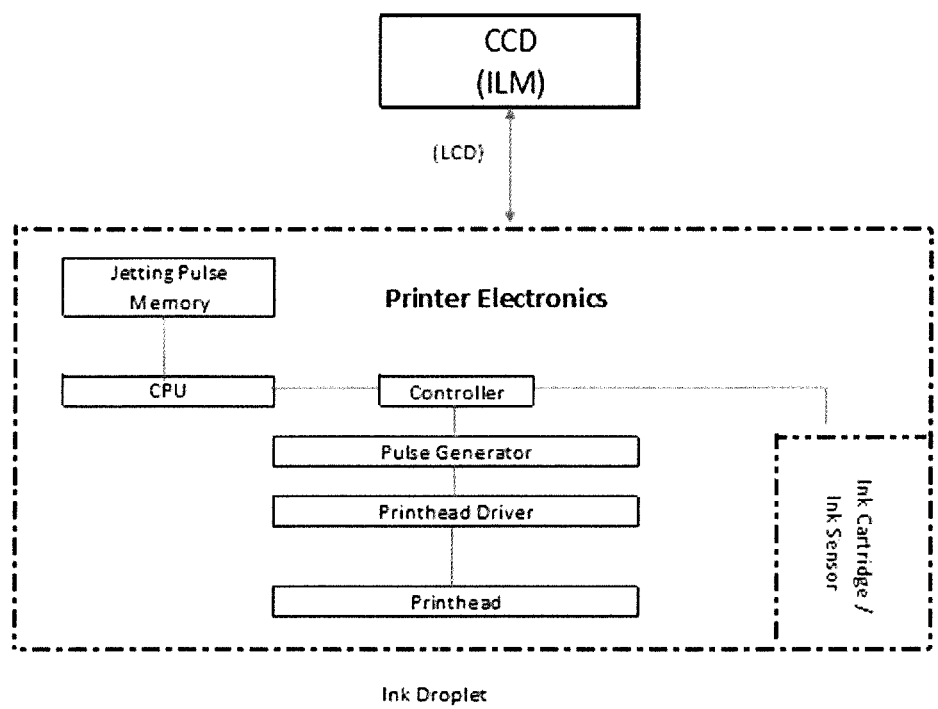
FIG. 9a is a block diagram demonstrating a central computing device (CCD) with Ink Monitoring System (ILM) communicating with a printer that is part of a printer network and showing relevant printer electronic components, including an ink level sensor.

FIG. 9a illustrates related electronic components and shows bi-directional communication between the CCD and a networked remote local digital printer The CCD incorporates an ILM.

By way of example, an inkjet printer comprises a central processing unit (CPU). A controller is interconnected with the CPU, a printer driver circuitry, and jetting pulse memory. An ink sensor is employed in the ink cartridge. An Ink cartridge or container (sometimes referred to an ink reservoir) is preferably factory sealed and protected from environmental contamination, and may be physically and electronically incorporated into the printer. Electronic circuitry, for instance, an ASIC (Application-Specific Integrated Circuitry) chip mounted on the ink cartridge completes the printer circuitry loop before it functions, and prevents undesired dry firing. Other mechanical and electronic components may be included in the printer according to the needs of the application.

The jetting pulse generator (or waveform generator), jetting pulse memory, the amount of ink transported through each channel (including ink transported for delivery system purging, priming, printhead cleaning), and the jetting of different droplet sizes (by applying different pulse or waveform intensity and length of time) to form the required image can be accurately recorded and sent to the CCD through the ILM. Additionally, different types of pulses may represent different ink droplet volumes for defined and calibrated ink identifications, and these volumes may be recorded separately. Jetting pulse memory may be reset or otherwise marked when a new ink cartridge is installed, with resetting accomplished either by the printer or by an external computing device. An ink sensor with ink volume measuring capability may be used with information communicated by an external computing device through the printer's electronic circuitry.

A Field-Programmable Gate Array (FPGA) electronic circuitry is proffered for the digital printer circuitries. The reprogrammable function of FPGA is especially useful when different waveform or pulse selection is required for changing ink sets, or for changing printing speed. Larger waveform or pulse amplitude and/or longer pulse duration, for example, will generate larger ink droplets for the same ink formulation, which may change the required printing speed at the same driving pulse frequency. These inks may not be optimally jetted with a universal jetting parameter selection due to different physical properties and fluid flow characteristics that respond differently to the selected waveforms. One embodiment of the present invention is to change jetting waveforms of the networked remote local printers using center, remote, or external computing devices. The printer's electronic memory may be volatile or nonvolatile for storage data, communicating with the computing device through printer input/output (I/O) circuitry. An Electrically Erasable Reprogrammable Memory (EEPROM) chip may be used for jetting pulse memory, either alone or in combination with other types of memory techniques, including simple ROM (Read-only Memory) chips.

Optionally, pulse and/or ink monitoring and calculations for the ILM may be performed at the RCD and communicated directly to the remote location printer, and synchronized in real time with the CCD. Each time a networked printer communicates its availability for use, or a new cartridge or ink container is installed, updated ink level information is sent to the external computing device before a print job is accepted.

Figure 9B:
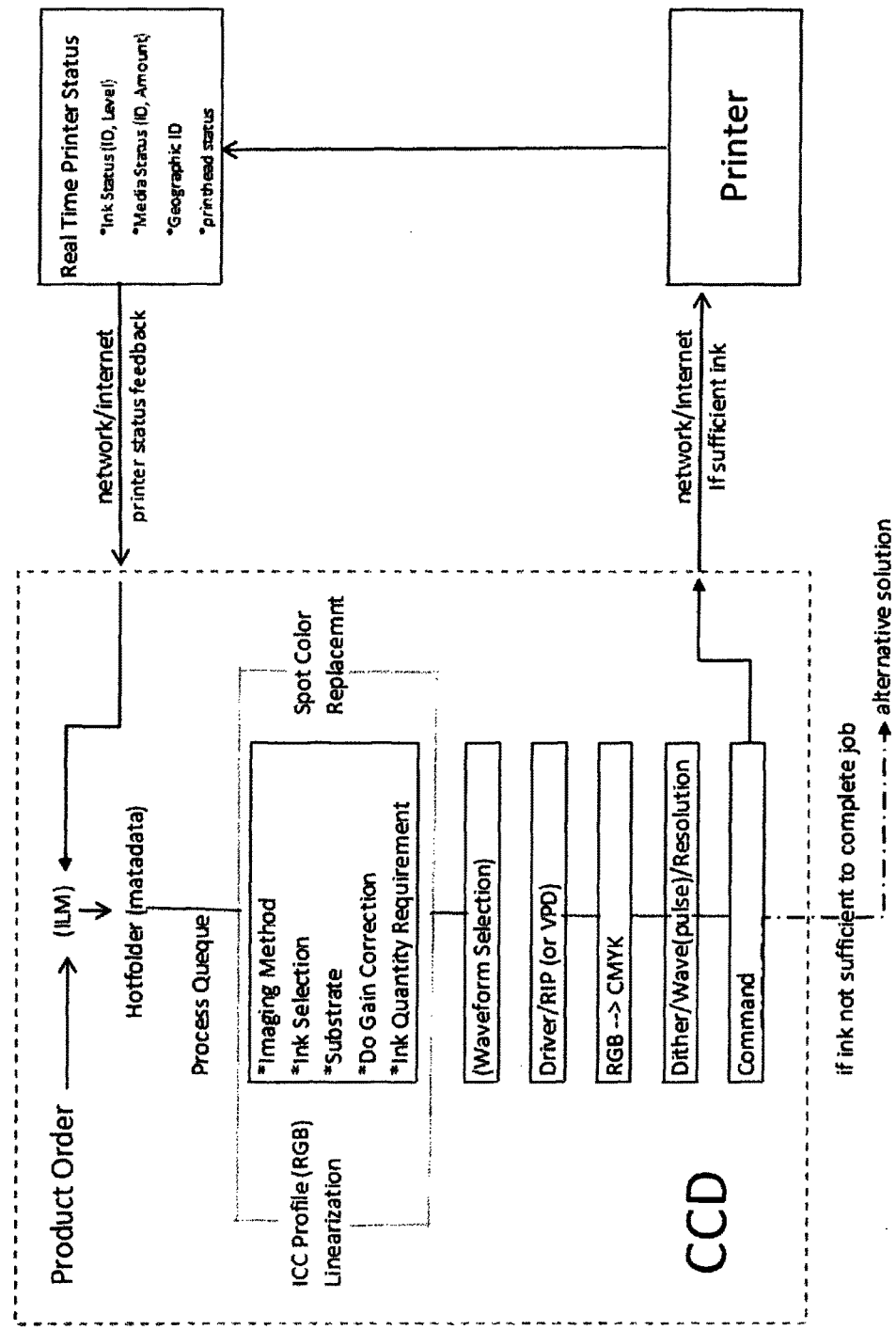
FIG. 9b is a block diagram illustrating decisions within the CCD and information exchanged between the CCD and a networked remote printer.

Each time a printing job is dispatched to a selected remote printer, a 'safeguard' of the CCD, which may be part of the ILM, actuates to compare the ink consumption requirement for the print job with the existing ink quantity at the remote printer for each and every color of inks in the cartridges or containers with an ink sensor, regardless of geographic distance of the printer from the CCD or the time of operation. If an insufficient ink amount status is detected, the printing job will not start, and a warning notice is sent to the printer or local computing device for replacement or refill of ink, or for printer maintenance. Either a different printer with sufficient ink supply is selected by the CCD and utilized, or a new set of ink cartridges or containers is required before further action. FIG. 9b further demonstrates a preferred interaction between a computing device and networked printers that ensures sufficient ink for the printing job without interruption. The ink levels are continuously monitored in real time during the printing process and updated at the CCD.

A single printing job as dispatched from CCD may require various final substrates or articles, each having a different ink usage for imaging. For instance, in heat transfer printing where sublimation inks are used, ink limiting factors, printing scan speed, jetting speed, dot gain correction, and waveform selection and/or pixel color ink quantities are a function of the final, imaged substrate and may vary even though the image design and intermediate substrate (or transfer media) are the same. Hard or non-absorption substrates such as metal sheets require less ink to achieve satisfactory color intensity than soft substrates like nonwoven textile materials. Substrate differences may be accounted for, applying ink limiting parameters by way of software that are appropriate to the substrate to be imaged. Customer orders for the same image on different products (for example, a holiday family picture on both ceramic mugs and fabric T-shirt items) may be combined into a single printing job through the same inkjet digital printer while maintaining optimal image quality using the same ink cartridge set through use of the present invention. The ILM may be used to accurately calculate and anticipate total ink consumption based on substrate correction information and other related parameters, including waveforms, for the same printing job imaging different final substrates, while incorporating the required changes at remote local printers. FIG. 9b.

To enhance the accuracy and/or efficiency of the unique printer profile for each remote location printers connected to the center computer device (CCD), a machine learning process, preferably unsupervised, may be utilized based on empirical printer performance data and continuous application behavior. Each time a new geographically remote printer is added to the network, a designated file is constructed through a software program to produce an independent data file in a database located in the CCD. Ink consumption behavior with different variables such as the type of printer, anticipated specific jetting (for new printers), jetting efficiency for different ink specifications, droplet sizes, ink evaporation due to humidity fluctuations, average printer prime/cleaning frequency during printing and standby periods, ink compatibility, media and/or substrate compatibility, etc. are established statistically and retained for future reference through a pre-defined mathematical model and data management algorithm that may employ extrapolation such as linear or binomial regression techniques. Model training software mechanisms, such as Knowledge Extraction based on Evolutionary Learning (KEEL) framework, may also be used for automatic selection of the optimal mathematical model chosen from available alternatives. Printing jobs are dispatched by the CCD with a completed metadata file comprising printer profile data output generated by the ILM.

A similar but simpler safeguard module at the central or local computing device may also be installed to monitor and calculate available printing media (substrates), such as by length or number of sheets. The printing job is not communicated to the printer if insufficient media is available, thereby avoiding prevent premature printing job termination and an unnecessary waste of printing media materials, particularly where the length of the media or substrate is insufficient.

For an extremely large multiple-page printing job exceeding the capacity of one complete set of ink cartridges or containers, the ILM intelligently selects one or multiple remote printers with the same or similar printing performance profiles, and of the same or similar type and model, ink batch, media batch, and geographic locations, to optimize process efficiency and minimize differences in printing jobs performed by multiple printers. Should unexpected interruption occur during printing, such as a power outage, internet communication interruption, natural disaster, unexplained heavy ink usage, etc., and the originally selected remote location printer cannot complete the printing job, the ILM at CCD will automatically select an alternative networked printer or printers having the closest parameters to the originally selected printer. These parameters may include geographic location, printer type/model, ink batch, media type, and the like, with geographic location typically a priority. Further, and optionally, a printer pause function may be inserted into the printer command, allowing a qualified (ink ID, ink batch, etc.) ink cartridge replacement at page-end (in cut-sheet printing mode) printing.

The ILM is resettable each time a new of ink cartridge or container is installed or refilled. The ink level is recorded as a "Full" status with a known value, and included in the printer profile for the specific printer. It is possible to reset a single color, or to reset an entire set of colors, but the ILM records each individual color ink cartridge or container due to the fact that different printing jobs may result in uneven consumption of color inks. Preferably, ink sensor or storage memory elements at the remote printer are resettable and used as an additional printer profile calibration factors.

A RCD may connect at least one digital printer to the CCD. The RCD may be linked directly with web server CCD. Multiple printers, each at different geographic locations, may be connected to the RCD for high efficiency, high throughput manufacturing operations. A RCD may be an independent electronic data processing center such as a desktop computer, a laptop computer or computer server loaded with software applications that communicate and pass commands between CCD and local printers. At least one data operating system is used, such as Microsoft Windows, Linux, or Apple OS X.

In an example, an image or multiple images are selected for printing as part of a print job. An ink specification is chosen for the imaging. For example, a liquid sublimation ink is selected. A substrate or substrates for imaging is selected. Typically, these selections are made by a customer and/or user or service provider. The CCD will contribute additional information to facilitate imaging that is based upon the selected ink and selected substrate(s).

The CCD determines a volume of ink required to form the images according to the specifications for the print job. The CCD communicates with a plurality of printers that are geographically remote from the CCD. By geographically remote and geographically separated it is meant that the CCD and each of the plurality of printers are geographically separated such that communication is by Internet or cloud connectivity, and that connection by hard wiring is not practical. Typically, the CCD is at least several kilometers from the printers, and the printers are located in multiple cities, states and/or provinces.

Each of the plurality of printers communicates to the CCD an ink specification available at the printer. Each of the plurality of printers communicates to the CCD a volume of ink available and the type or specification of ink available. Substrates that are available at the printer location may be communicated to the CCD. The geographic location of the printer may be communicated by an identification code known to the CCD.

The CCD then selects a printer or printers from the plurality of printers to fulfill the print job. The selection takes into account the geographic location of the printer(s), the ink specification available to the printer and the volume of ink available at the printer. The CCD provides to the printer information and specifications of the print job for fulfillment of the print job according to customer requirements. The imaging information may comprise, inter alia, an image specification, an ink specification, a waveform specification and a substrate specification. The imaging information may be provided in a metadata file communicated by the CCD to printer. The image specification may comprise visual graphics (design) information, colors, image size and image resolution.

The CCD may determine the volume of ink required to form the image or images on a substrate or plurality of substrates as a function of pulse counts required for the image specification, ink specification, and substrate specification as described. The foregoing example contemplates large print jobs, where more than 50 cubic centimeters of ink are consumed by a printer to complete the print job.

One other embodiment of the present invention divides the cloud storage at the CCD into multiple and separate "hot folders" designated for different remote fulfillment process centers or RCD that are remote from each other. Metadata files of each printing job with ink quantity requirements created from the client device may be accessible at each of the three locations as shown (client device, CCD, and RCD) for further editing, storage and/or processing operations. Different privileges may be assigned or changed for editing, coding/encoding, grouping/regrouping of metadata files for different RCD and/or client devices when such changes are needed. Depending upon the selection method hot folders may be categorized as, for example, according to printing method, ink type and quantity, media and/or substrate type and quantity, printer, processing equipment, etc. This method enhances organizing efficiency and reduces the possibility of mismatching among various criteria used in the processes. The following markup language exemplifies inserting a processed composite image file "My design.png" into a printing hold folder in the cloud. A white color t-shirt is used as a substrate and imaged with sublimation ink using waveform "Std A" at the corresponding printer.

POST http://webservercompany.com/api/print_hot-folder_3 JSON Request:

```
{
"Design" : "My design.png", "Substrate" : "T-Shirt",
"Color" : "White",
"Inktype": "Sb05",
"Waveform": "Std A", "Location" : "Auto"
}
JSON Response
{
"success" : true, "jobID" : 911B873CF
}
```

Figure 10:
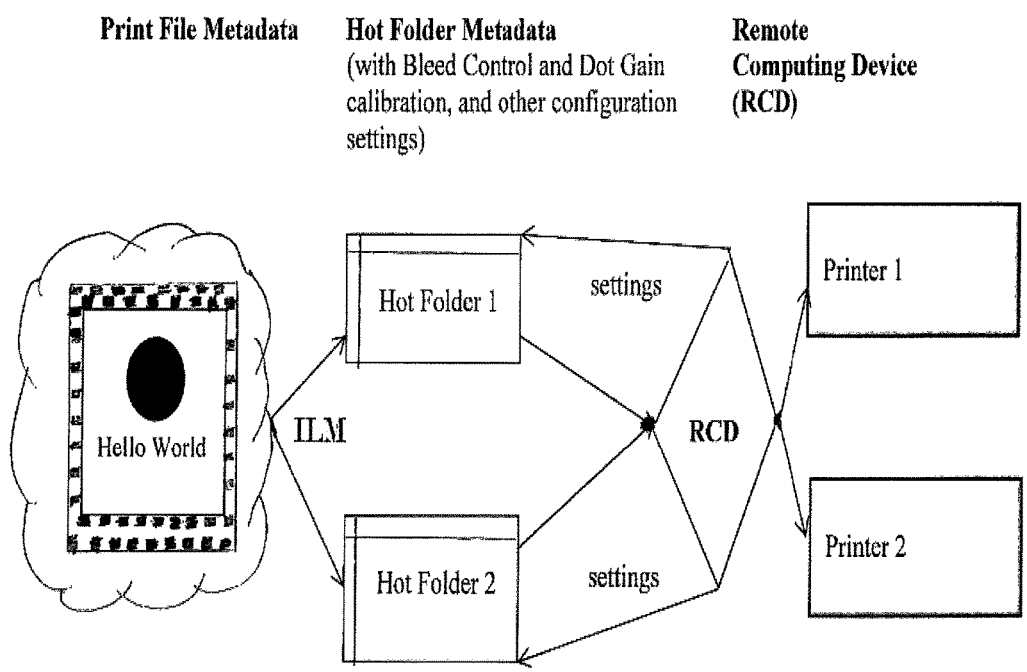
FIG. 10 is block diagram of metadata management and printing control through Hot Folder storage
Figure 11:
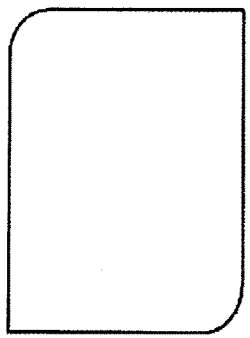
FIG. 11 depicts a transfer imaging process of a substrate.
Figure 11:
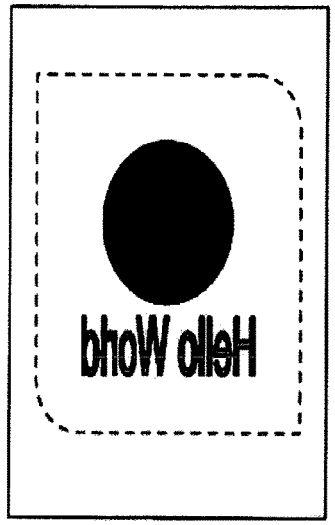
Figure 11:

FIG. 10 demonstrates a uniquely shaped blank product imaged by a heat activation transfer imaging process, incorporating a printing medium (intermediate medium). Note that the printed medium is the same size as the printed file and that metadata such as substrate, print quantity, spot color replacement, ICC profile are taken into consideration. The printed medium is placed in contact with the blank product where heat is applied to activate the ink and permanently bond the image to the substrate.

The inkjet printer of the present invention preferably uses high resolution printheads that are preferably supported by firmware having an embedded algorithm calibrated with a data matrix that is dictated by the imaging characteristics of the specific heat activatable ink used. In particular, characteristics for both the first and second levels of dot gain are considered for selected substrate(s) and heat activation parameters. Depending on the incoming fulfillment requirement with quality/resolution information, the algorithm calculates and anticipates the final resolution/dot size, and adjusts printhead jetting behavior and ink droplet volume accordingly throughout the entire image printing cycle, based on the specific, final needs of the image, which is unique for each heat activatable ink application.

The embedded algorithm may be preset on the printer/printhead firmware, but preferably on the RCD and connected to the printer. The embedded algorithm may be adjusted or updated with data that is best suited to the ink and substrate to be printed. Ink characterization and controls may be used prior to printing, or during printing, of the substrate performed by the RCD. Though managed by the RCD, various types of controls may be employed, either directly, or through a variety of software communications, such as a printer driver, raster image process software, color management/profiling software, add-on for graphic application software, etc., as demonstrated in FIG. 9b. In addition, the level of control and degree of adjustment may be different for each ink color channel of the printer to best match color or image quality requirements.

The ink dot gain calibration and/or adjustment data matrix may be achieved by collecting information from factors such as ink color, the specific heat activatable colorant used, intermediate substrate characteristics, heat activation parameters, jetting behavior, and droplet size used to generate each color of the image. (FIG. 4) This determination may be made by empirical observation of actual printing of selected imaged substrates based upon measurements taken by instrumentation, such as a densitometer. The review is similar to a color profiling process, but with particular analysis and measurement of dot gain data. Multiple iterations may be needed to achieve a preferred data matrix that yields high quality and accurate imaging.

Figure 5:
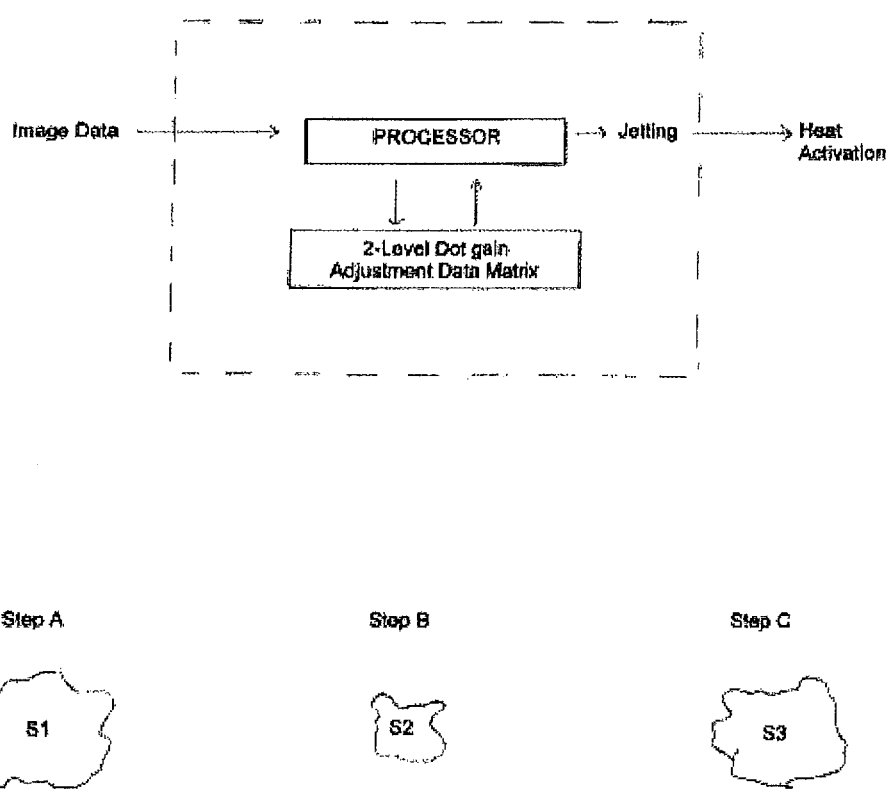
FIG. 5 is a flow chart demonstrating processor adjustment for dot gain control, and dot gain results from the adjustments.

FIG. 5 demonstrates the dot gain adjustment process when the factors listed above are considered. When image data is sent to a printhead (Step A), ink dot size (S1) represents a desired ink dot size for each color element after heat fixing of the colorant to the final substrate. Anticipation of dot size and adjustment of jetting are made based upon the adjustment data matrix, which provides information for correction based upon ink droplet size/volume, color combinations, dithering orientation and/or overlapping techniques. From this information, the printhead generates a corresponding dot size of S2, which is smaller proportionally for dot gain correction purposes, that is printed on the intermediate substrate and prior to heat activation. Upon activation of the color image, the colorants forming the image obtain their final color, size and shape on the final substrate as the final size of S3. With a carefully fine-tuned algorithm and data matrix control including ink droplet size adjustment/waveform change, ink/color saturation level correction which impact both levels of dot gain adjustment, S3 will be as close as possible to the desired (S1) dot size in both size and color accuracy.

A preferred printhead has at least two arrays of printing nozzles that are offset with at least one nozzle position in alignment with another. To achieve high quality imaging, a linear nozzle resolution of 150 nozzles per inch or higher is desired. That is, each nozzle array has at least 150 printing nozzles per inch along the direction of the array. The nozzle arrays may be fed by different ink reservoirs or ink tanks, each of very small volume or capacity and positioned inside the printhead upstream from the piezoelectric mechanism, or the nozzles may share one ink reservoir in order to gain high-speed printing, or to improve native printing resolution. By using various physical mounting configurations, and/or applying multiple printing passes, jetting frequency, and/or advancing motor and scanning motor stepping gaps, as well as jetting variable size ink dots (ink droplet with different volumes), native printing resolution of 600 to 1440 dpi, or more, may be achieved, depending on specific ink droplet volumes.

To achieve proper droplet formation with well-defined jetting outcomes careful selection of the jetting waveform or wave pulse is employed. The voltage-time function may be single, double or multiple-peak in shape, depending on the fluid flow dynamic behavior of the heat activatable ink of each and all colors used. Overlapping of multiple pulses with various amplitudes (voltage), shape (for example, rectangular, triangle, sine, etc.), and durations (both pulse and dead time) may be used to secure successful pinch off of droplets while minimizing satellites from jetting of the ink.

Multiple sets of printhead performance data, such as waveform, may be stored or accessible by RCD from the cloud to drive a printer or printers connected to the RCD. This enables a change of jetting droplet size (small, medium or large), frequency/speed, and jetting quality to match different ink physical properties such as viscosity, surface energy, and specific gravity. Ink physical properties may also be impacted by temperature and humidity conditions where the printer/printheads are located. Optimal printer performance and print quality may require the use of a calibrated set of waveforms. Automatically switching and adjustment by the RCD can minimize or eliminate human operator errors in a highly efficient manner in operation. This is especially useful when one printer is equipped with two or more sets of inks, each having different physical properties and/or performance characteristics. Examples include regular four process-color inks (Cyan, Yellow, Magenta, and Black) plus light color inks (such as light Cyan, light Magenta, and light Black, and/or a clear ink), where more than one printhead is used, and different optimal driving waveforms are preferred in order to reduce primary and secondary dot gain.

Optimal printhead driving parameters such as waveform, pulse frequency, ink droplet size, pressure, and voltage, may be obtained by tweaking drop-on-demand (DoD) printhead piezoelectric controller parameters, including voltage height, shape, and time span/duration. This process is typically performed using an ink droplet analyzer or ink droplet observer where video recording or high speed cameras are used during experimental printhead nozzle or channel jetting to compare performance at various settings for each unique printing ink. Settings in binary form for the most suitable waveforms at a desired driving frequency may then be stored and provided to the printhead controller prior to performing a printing job. Typically, a trapezoidal waveform is used for aqueous based inkjet inks but the special parameters must be fine-tuned to achieve the required resolution, speed, and/or cleanness (the least degree of satellites, tailing, or the like).

In an application where a single drop-on-demand piezoelectric printhead is used to deliver or jet multiple color inks, whether process-color, spot color, fluorescent color or a combination of various types of inks, it is important that the physical properties of the inks are similar so that the response to the selected driving waveform and/or frequency is substantially the same for each. Generally speaking, physical properties of the ink related to driving behavior include rheology or viscosity, surface and interfacial tension, specific gravity, solid sedimentation behavior, liquid evaporation speed, and the impact of temperature sensitivity on these properties. Careful control of these properties by adjusting different ingredients in the liquid jetting inks may be crucial to jetting performance and consistency of the inks.

When an order is received at a remote fulfillment process center from the CCD, the RCD, the encoded or encrypted metadata file is decoded or decrypted. Information regarding the specific image file and instructions are released by the RCD to the manufacturing process. Proper parameters for printing (waveform, driving force, color management, ink limiting, imaging resolution, dithering, independent printer ink channel control, etc.), consumables (ink type, paper or intermediate substrate, substrate/final media), procedures (material preparation, after-treatment procedure, etc.) and shipping and handling preferences, etc. are employed accordingly. Operating personnel may then follow the instructions at specific printer(s) and equipment to finish the tasks.

The networked, remote local printer and/or the RCD used in an embodiment of the invention carries a geographical identification signal by using a geo-location application programming interface (API), indicating the geographical location (latitude and longitude) of the remote fulfillment process center for the purpose of cost calculation of shipping and handling, pickup or delivery, etc. This signal may be communicated with CCD for operation and task control and monitoring. A variety of mapping API services, including commercial services such as UPS, Fedex, USPS, may be used for cost estimation or calculation. Customer or client devices may have the option to select from various process locations from the online design and ordering software for selection of the preferred delivery method. For instance, a traveling customer may design his product order from Denver, Colo., U.S.A, and choose to pick up his order from Moscow, Russia, where he is to present the product to his hosting party. A remote fulfillment process center in Moscow or at its nearest location may be recommended and chosen by CCD to process the order for the fastest processing time and the least expensive shipping charges.

Preferably, information used by RCD, such as color profiles (ICC profile), dot gain calibration and correction lookup tables, ink limiting and linearization files, waveform settings, and/or virtual printer drivers (VPD) etc. are stored on internet/cloud, and are accessible to multiple printers/users. This improves data security, and also allows the CCD to update the most recent and effective parameters, and decrease the probability of erroneous operations. Optionally, the RCD may be used in combination with an OEM Printer Driver or RIP (Raster Image Processor). In one embodiment of the invention, the entire information package may be formatted as an installable file (.exe file for MS Windows operating system, .dmg file for OS X operating system) allowing a user connected to the Internet to access and download for local installation prior to printing.

The RCD is preferably connected with at least one printer with Ethernet protocol (IEEE 801.3). Other protocols may also be used such as Firewire (IEEE 1394), USB (Universal serial Bus) 2:0/3.0, Bluetooth (IEEE 802.15), WIFI (IEEE 802.11) etc. as long as the communication satisfies imaging file transmission speed requirements. In addition, the RCD may connect with a digital display monitor, or a regular document-printing device, for the purpose of displaying operating instructions to human operators using the system. The relevant operating instructions are included in the metadata file received from the CCD. At the end of each manufacturing process, feedback and status reports may be sent to the CCD along with various monitoring, cost analysis, customer notification, and/or inventory control purposes. Information regarding inventory and support control include, but are not limited to, consumables (ink, paper, intermediate media, shelf-life of consumable), workload, equipment and hardware status, weather (temperature, humidity, extreme weather condition), labor status, and local transportation status, etc.

The following programming examples show communications between CCD and RCD. The first example reports that a RCD is connected, and reports the status of a set of three printers available on that node with each carrying different inks, waveforms, and on-printer ink cartridge usage leveler. This allows CCD to determine whether any parameter changes should be made, or whether materials and supplies are needed, etc.:

HTTP POST http://cs.company.com/api/hadig25/report_status JSON request:

```
{
"auth token" : "5ad0eb93697215bc0d48a7b69aa6fb8b",
"host_name": "RCD-A",
"printer": {
"name" : "Printer A",
"status" : "Online",
"inktype": "Sb05",
"waveform": "Sb35", "cyan_level" : 36,
"magenta_level" : 84,
"yellow_level": 54, "black level" : 35
},
"printer": {
```

-continued

```
"name" : "Printer B",
"status" : "Out of paper", "inktype": "Pg01",
"waveform": "Std03",
"cyan_level" : 33,
"magenta_level": 48,
"yellow_level": 45, "black level" : 53
},
"printer": {
"name": "Printer C",
"status" : "Offline",
"inktype": "Hb01",
"waveform": "Std A",
"cyan_level" : 0,
"magenta_level" : 0,
"yellow_level" : 0, "black level" : 0
}
}
JSON response:
{
"success" : true
}
```

In the following second example, the RCD queries the CCD for pending jobs ready to print. The response indicates ready jobs and the unique URL at which the print data can be retrieved at each of the three printers at the location.

HTTP POST http://cs.company.com/api/hadig05/query_pending_jobs JSON request:

```
{
"auth token" :
"5ad0eb93697215bc0d48a7b69aa6fb8b",
"host name": "RCD-A"
}
JSON response:{
"job": {
"printer_name": "Printer A", "job_name": "Sample job 1", "copies" : 1,
"url":
"http://cs.company.com/jobs/c2300c87-57a7-4acd-bd8d-
f005ca7dca8e.prn"},
"job": {
"printer_name" : "Printer B", "job_name": "Sample job 2",
"copies'.' : 1,
"url":
"http://cs.company.com/jobs/7653a379-7995-46f4-b51c-
213b2e716785.prn"
},
"job": {
"printer_name": "Printer A", "job_name": "Sample job 3", "copies": 2,
"url": "http://cs.company.com/jobs/0074ac2e-24ce-4054-b910-
1c3f7151ecf5.prn"
}
}
```

The Inventory/support center depicted in FIG. 6 may be in a remote location linked with the internet/cloud for information communication. It comprises material/consumable and hardware/equipment/supply stocks, and may be dispatched as needed. It may also provide supporting technical resources for diagnosis, repair, and/or training. A Just-in-Time (JIT) status of each and every remote fulfillment process center (via RCD) is monitored by the center through CCD to determine the best approach for operational actions.

While the medium onto which the image is printed for subsequent transfer may be paper, the medium may also be film, textile, metal or other substrates, for either direct or transfer printing applications. With transfer imaging processes, the printing medium may be called an intermediate substrate or medium. While different conveyance mechanisms for the medium may be employed, it is preferred that the medium is transported through the printer carriage in a direction perpendicular to the printhead scan direction. The printer must convey the medium/substrate through the printer during the printing process at a selected advancing velocity in order to achieve acceptable print quality. The surface characteristics of materials of films, metals and textiles vary to a material degree from paper and from each other. The surface friction of metal is substantially different from a textile such as a poly/cotton blend. Accordingly, the medium conveyance or transport mechanism of the printer when used to print media other than paper must be constructed for media of various thicknesses, rigidity and/or surface property at a desired velocity to ensure adequate ink droplet impact stability.

The inkjet printer is preferred to use factory sealed ink cartridges that contain the preferred aqueous ink comprising heat activatable dyes. In order to eliminate and/or minimize bacteria contamination, chemical reactions such as oxidation or reduction, jetting bubbling, stellateing, and other adverse impacts during the ink drop formation process, the liquid ink in the ink cartridge should have no more than 5.0 parts per million air, and is more preferred to have no more than 3.5 parts per million air, and is most preferred to have no more than 3.0 parts per million air after the cartridge is filled with liquid ink and sealed. The inkjet ink according to the invention tends to develop undesired crystallization due to presence of solids in the ink when the air volume in the filled cartridge is higher than the specified amount.

To prevent inconsistent color and/or product quality results, it is important that each participating remote fulfillment process center and associated printer(s), equipment, consumables, and supplies are calibrated using the same standard. For instance, color standards for textiles may be used to calibrate inks, substrates and equipment performance for each participating remote fulfillment process center. These often involve standard calibration equipment such as colorimeter, colorfast equipment, weather meter, and/or detergent. A certification program using the standard may be elected and enforced prior to commercial applications for each remote fulfillment process center to achieve reliable manufacturing quality. Customized standards, or a combination of various standards, may be used to control and monitor consistent performance across the entire system.

In one embodiment, air is removed from the ink so that air is present in the ink at a level of no more than 3.5 parts per million prior to filling the cartridge. Degassing occurs during the filling process so that air is present at a level of no more than 3.5 parts per million after completion of the filling process. Air may be removed from the cartridge after it is filled and the ink has settled and has released additional dissolved air.

The preferred printer of the present invention allows a selection of ink droplet sizes printed from the print head of the printer that form each dot. Selection of ink droplet sizes is either automatic, based on imaging information and an algorithm calibrated from software or firmware, or manual and selected by the user for specific imaging requirements. Ink droplet size selection is employed to reduce or eliminate undesired dot gain or color matching produced at both jetting and jetting processes.

For instance, 400% dot gain (resulting from the particular ink, color, tone mixing dithering, substrate, and heat activation parameters employed) may be controlled by using proportionally smaller ink droplets during jetting, thereby achieving a satisfactory result of half tonal precision. Preferably, at least three levels of droplet size are employed. These droplet sizes may be categorized as small (Sm), medium (Med) and large (Lg). The calibrated algorithm or user can select which category is preferred to produce the desired outcome. While smaller ink droplet size enhances precision, accuracy of image dots, and the total number of colors through dithering patterns, as well as avoiding undesired image continuous tone generation, larger ink droplet sizes improve imaging intensity, printing speed and ink usage effectiveness and efficiency. Careful balancing of the selections of droplet volume combination, through the use of the heat activatable ink characteristic data matrix and imaging algorithm, may result in an optimal outcome.

A volume of ink printed for each dot is preferred to be between 1 picoliter and 15 picoliters. Each Small droplet is preferred to have a volume of not more than 4 picoliters; each Medium droplet is preferred to have a volume of not more than 7 picoliters; and each Large droplet is preferred to have a volume of not more than 15 picoliters.

In a specific embodiment, the printer emits selectable ink droplet sizes of small droplets of not more than 2 picoliters; medium droplets of not more than 6 picoliters, and large droplets of not more than 9 picoliters. At the large droplet setting for four colors (CMYK), the printer delivers an ink dot of 36 (4×9) picoliters. Grey scale discharging of more than three volume levels of ink droplets may also be used for more sophisticated control.

In addition to printing resolution or ink droplet size, printed image quality is impacted by the number of colors that comprise the image. To reproduce a photographic image, fine details must be generated, and also, faithful reproduction of each of the original colors of each dot/pixel should be achieved, especially for transitional colors and/or facial (skin color) toning accuracy. In general, a photo quality printed image having resolution of no less than 1200 dpi (sometimes called native dot-per-inch resolution), and not less than total of half a million (500,000) colors should be achieved. High resolution printing, achieved by combining multiple colors of inks, and employing proper dithering or half-toning techniques, prefers color cell (the smallest color component in dithering or half-toning) sizes of not less than 300 cell units per inch. Though higher printing resolution may result in finer color cells, human eyes unaided by magnification normally cannot differentiate details beyond 300 units per inch. The present invention preferably uses a cyan, yellow, magenta, and black (4-color) ink set, with 600 to 1200 DPI printing resolution, with selectability of droplet sizes as described herein, and use of a dot gain algorithm for dot size control. These characteristics enable the process to produce photographic image quality at acceptable printing speeds.

The printhead may employ a relatively broad spectrum of driving force frequencies for the piezoelectric system. Variable driving force frequencies allow the production of well-defined ink droplets of variable volumes. "Well-defined ink droplets" means minimizing undesired non-jetting, tailing/Rayleigh breakup, elongation, satelliting or bubble bursting of the droplet at the tip of the surface of printing nozzles. Depending on the physical properties of the heat activatable ink, the driving force frequency may be between 5 kHz and 40 kHz, preferably between 8 to 20 kHz for small printers of the preferred embodiment.

The liquid inkjet ink has a preferred viscosity of between 2 to 100 cPs, with total water content of not less than 30% by weight of the total ink formulation. A preferred viscosity range is from 3 cP to 30 cP. A heat activatable colorant, such as sublimation dye, is present in the ink. The ink as printed comprises solid dye particles. The specific amount of the colorant(s) is supplied by the printer to the medium to achieve proper color intensity and image quality upon heat activation. The colorant is preferred to range from 1% to 15% by weight of the total ink formulation.

In order to avoid droplet formation difficulties and/or inconsistency of the jetting process due to the presence of high liquid viscoelasticity, polymeric constituents and materials, if used, are preferred to be below 500,000 in molecular weight. Dispersants, binders, physical property modifiers, rheology control agents, or thixotropic additives having such properties are preferably avoided in the ink formulation. More preferably, polymeric materials, either natural or synthetic, with molecular weights, if used, are below 300,000 in molecular weight. Heat activatable colorants suitable for use may include various disperse dyes or sublimation dyes with different activating energy levels. The colorants are activated or sublimed by applying heat to the printed substrate and/or transfer substrate. Generally, the heat activation temperature does not exceed 235° C., and most preferably, does not exceed 210° C. Examples of colorants, in varying ratios, include but are not limited, to C.I. Disperse Orange 13, 29, 31:1, 33, 49, 54, 55, 66, 73, 119 and 163; C.I. Disperse Red 4, 11, 54, 60 72, 73, 86, 88, 91, 92, 93, 111, 126, 127, 134, 135, 143, 145, 152, 153, 154, 159, 164, 167:1, 177, 181, 204, 206, 207, 221, 258, 278, 283, 288, 311, 323, 343, 348 and 356; C.I. Disperse Violet 33; C.I. Disperse Blue 4, 13, 56, 73, 113, 128, 148, 154, 158, 165, 165:1, 165:2, 183, 197, 201, 214, 224, 225, 257, 266, 267, 287, 358, 359, 360, 379, Disperse Brown 26, 27; and Disperse Yellow 5, 42, 54, 64, 79, 82, 83, 93, 99, 100, 119, 122, 124, 126, 160, 184:1, 186, 198, 199, 204, 224 and 237. Disperse or sublimation dyes with modified forms such as latent azo dyes capable of forming heat activatable dyes, grafted disperse/sublimation dyes, polymerized or encapsulated disperse/sublimation dyes may also be used.

Preferably, the present invention uses a 4-color ink set with cyan, magenta, yellow and black (CMYK) as the ink colors. Additional process or spot colors/special colors, including colors outside of the human perception range, may also be used to broaden color gamut, printing efficiency, or special color and/or texture effect. In some occasions, inks without heat activation properties may be used alone or in combination with inks comprising heat activatable colorants for intermediate medium printing surface conditioning, sublimation/diffusion masking, polymeric material transferring etc.

The colorant remains in the ink as a particulate that is conditioned for heat activatable ink jetting. A process of printing the ink onto the medium for subsequent heat activation or sublimation to achieve optimal imaging results is described. Suitable examples of inks for use in the system may be referenced from U.S. Pat. No. 8,425,029.

Other types of digital printing inks may also be used for the present invention, either in combination with the heat activatable inks or alone. Printing performance may be enhanced by using first level dot gain control where a direct printing technique is applied, and ink jetting parameter fine-tuning for various porous and/or non-porous substrates that are best suited for the selected ink type. Reactive dye ink, direct dye ink, acid dye ink, cationic dye ink, reactive disperse dye ink, pigment inkjet ink, crosslinkable/self-crosslinkable ink, hot-melt 3D printing ink, radiation or energy curable ink, such as ultraviolet radiation curable ink, may be used alone or in a mixed fashion. For instance, an 8-channel printer may use dual CMYK ink sets, with one set being heat activated inks and the other set being radiation curable inks. During the printing process, each of the two sets is being printed independently, using specific sets of printing control parameters including dot gain control, jetting frequency, waveform and ink droplet size, and the like directly from CCD, or indirectly through RCD The reactive dye ink referred in the present invention is digital printing ink comprising reactive dye colorants. These are organic, water soluble dyes with chromophore containing substituents or functional groups that react with a substrate, resulting colorfast printed images on the corresponding substrate. Most commonly, the substrates are cellulosic materials such as cotton, wool, flax, and nylon. These materials contain hydroxyl, amine or other active functional groups in a structure that reacts with reactive dyes to create covalent bonds with proper treatment. Examples of suitable reactive dyes for digital printing purposes include, but are not limited to, Reactive Red 245, Reactive Orange 95, Reactive Orange 13. Specific examples are those sold under the trade names Procion H, Procion MX, Primimazin P, Reatex, Cibacron T, Levafix E, Solidazol, Remazol, Hostalan, Procinyl, Lansaol, Proxion T, respectively.

The acid dye inks referred in the present invention are digital printing inks comprising acid dye colorants. These are sulfuric, carboxylic or phenolic organic acidic dyes having affinity for cellulose fiber, and/or mercapto or amino functional groups in polypeptide chains of protein fibers, such as wool and silk, or with the amino groups in polyamide fibers such as Nylon 6 and Nylon 6.6. Examples of acid dyes suitable for inkjet ink printing include Acid Blue 260, Acid Blue 106, Acid Blue 258, Acid Green 28, Acid Black 194, Acid Yellow 79, Acid Orange 33, and Acid Violet 48. Acid dyes form covalent bonds with the mentioned substrate material through chemical reaction.

The pigment ink referred to in the present invention is a digital printing ink comprising organic or inorganic pigments. These pigments are colorants without substantial (sparing) solubility in the ink carrier system, with fine particle sizes, and formulated in a dispersant, binder, and/or other chemical agents/additives in addition to the carrier liquid. Pigment inks may be non-reactive or reactive in nature. The latter may comprise reactive ingredients that are capable of crosslinking with substrate materials, such as taught in U.S. Pat. No. 6,341,856. Examples of organic pigments suitable for the invention include, Pigment Black 7, Pigment Blue 1, Pigment Blue 15, Pigment Blue 15:2, Pigment Blue 15:3, Pigment Blue 56, Pigment Blue 61, Pigment Green 7; Pigment Red 2, Pigment Red 3, Pigment Red 4, Pigment Red 49:1, Pigment Red 49:2, Pigment Red 52:1, Pigment Red 52:2, Pigment Red 53:1, Pigment Red 53:3, Pigment Red 57:1, Pigment Red 63:1, Pigment Red 81, Pigment Red 112, Pigment Red 122, Pigment Red 144, Pigment Red 146, Pigment Red 166, Pigment Red 170, Pigment Red 171, Pigment Red 175, Pigment Red 176, Pigment Red 177, Pigment Red 179, Pigment Red 184, Pigment Red 185, Pigment Red 208, Pigment Red 120, Pigment Red 243, Pigment Red 266; Pigment Yellow 1, Pigment Yellow 3, Pigment Yellow 13, Pigment Yellow 17, Pigment Yellow 65, Pigment Yellow 75, Pigment Yellow 180, and Pigment Yellow 183. Inorganic pigment examples include, Pigment 32, Pigment Yellow 34, Pigment Yellow 36, Pigment Yellow 42, Pigment Red 101, Pigment Red 104, Pigment Blue 27, Pigment Blue 29, Green 17, Pigment Black 11 and Pigment Orange 21.

The radiation curable ink referred to in the present invention is a digital printing ink comprising radiation curable reactive constituents which can go through radiation initiated photopolymerization forming adhesion and cohesive bonding to the printed substrate materials. Most of the ink systems are acrylic monomers with photo-initiating agents, with or without colorants, and dried or cured after the printing on substrates by various types of radiation methods. Examples of curing methods include ultraviolet radiation, and electron beam radiation.

The 30 printing ink, or three-dimensional digital printing ink referred to is a digital additive method printing ink. Typically, a digital printing image file for a three-dimensional shape is created or modified with computer aided design (CAD) software from either scanned or photographically captured original files. An object to be imaged is then printed or built with multiple layers until the entirety is completed. 30 printing ink may be hot-melt in an embodiment, such as a thermal plastic polymeric material printed through a heated print head, where the material is in liquid form before accumulating and solidifying after jetting. Nylon (polyamide), ABS (acrylonitrile butadiene styrene), PPSF (polyphenylsulfone), PSU/PPSU (polyarylsulfone), PEI (Polyetherimide), PC (polycarbonate), are suitable hot-melt 30 printing polymeric materials. 3D printing ink may also be of the radiation curable type. In the latter case, each jetted ink layer is cured (or dried, or solidified) by a radiation energy source such as UV (ultraviolet radiation), electron beam (EB) and various types of laser radiation, forming a crosslinked or fused polymeric or sintered solid. Other types of 3D printing methods may also be used for the purpose of generating solid objects from 3D image files. Examples include, Direct Metallaser Sintering (DMLS), Fused Deposition Modeling (FDM), Stereolightography (SLA), Digital Light Processing (OLP), Fused Filament Fabrication (FFF), Melted and Extrusion Modeling (MEM), Laminated Object Manufacturing (LOM), Electron Beam Melting (EMS), or Laser Engineered Net Shaping (LENS).

In an exemplary imaging method according to the invention, a geographically RCD transmits an image to a CCD, FIG. 6. The image may be provided by a user of the geographically RCD by creation of the image on the device or on another computing device. The image may be downloaded from another source.

The geographically RCD may be a computer, including, but not limited to a desktop computer, notebook computer, tablet computer or a cellular telephone with such capacity.

The CCD may communicate to the geographically RCD an image or selection options comprising several images. The images may be manipulated as to form and appearance by a RCD, as demonstrated at FIG. 8*a*.

The geographically RCD also communicates specifications of a substrate or substrates to be imaged to the CCD. Optional substrates may be first communicated to the geographically remote RCD, with the user of the geographically RCD selecting specifications of a substrate or substrates upon which the image is to be formed (FIG. 7*a*).

The CCD selects a geographically remote fulfillment printer. It is preferred that remote fulfillment printers that are part of the network comprise different technologies and configurations to handle different required printing specifications, and are available at many separate locations, such as in most cities in world. The invention as described, in an embodiment, can image an intermediate substrate such as paper, using relatively inexpensive desktop printers and heat activated inks, such as ink jet printer ink comprising sublimation dyes. A printing operation that will fill orders for customizing many substrates only costs a few hundred dollars, and therefore, such remote printers can be made available at minimal cost a location that is very near the consumer of the imaged substrate. Local fulfillment that is part of a geographically diverse distribution system is available according to the invention. In some cases, certain imaging requirements will require more sophisticated remote fulfillment printers. The CCD chooses the geographically remote fulfillment printer as a function of factors such as the selected image and substrate, printer capabilities, and the consumer's location. Image quality and consistency is maintained by the CCD selecting an appropriate geographically RCD and providing printer the appropriate instructions, rather than the instructions for printing being determined locally at the printer.

The CCD communicates a graphic image file for the image to be printed, along with the specification(s) of the substrate to a fulfillment computing device (RCD) that is associated with the geographically remote fulfillment printer. The CCD may also select an ink specification from a plurality of ink specifications. The ink specification is communicated to the fulfillment computing device (RCD), FIG. 8b.

The CCD communicates printing instructions to the RCD or fulfillment computing device. Determining the instructions for the image and substrate at the RCD maintains quality and consistency from location to location. These instructions may include, color management profile(s), ink limiting parameters and print head waveform. These instructions are selected by the central computer as a function of factors such as the printer capabilities, graphic image file requirements, the ink specification and the specification of the substrate. Other information communicated from the CCD to the remote fulfillment computing device (RCD) and or printer may include image resolution, ink droplet sizes, and frequency, such as piezo pulse frequency, pulse pressure and voltage to the geographically remote fulfillment printer.

The CCD and/or the fulfillment computing device (RCD) causes the geographically remote fulfillment printer to print the image selected using the ink selected and according to the information provided by the CCD. The printer forms an image according to the image selected to be formed on a substrate according to the specification of the substrate selected from the RCD.

In one embodiment, the ink selected by the CCD is a heat activated ink, such as an ink comprising sublimation dye. The geographically remote fulfillment printer prints the image selected on an intermediate substrate, which may be paper. The image is transferred by application of heat and pressure to the substrate, which is rarely paper, and is commonly a ceramic, metal or textile substrate. The substrate may be three dimensional in some instances.

In other embodiments, the image may be formed by directly printing on the selected substrate. The ink may be selected by the CCD from, for example, dye based inks, heat sensitive inks, radiation curable inks, and 3D heat fusible printing inks. The inks are selected as a function of factors such as the image to be printed, printer capabilities, waveform addressability, media or substrate handling ability, and the selected substrates.

What is claimed:

1. An imaging method, comprising the steps of:
    selecting an ink specification for forming an image, and selecting a substrate upon which the image is formed;
    a central computing device determining a volume of ink required to form the image and the central computing device communicating with a plurality of printers that are geographically remote from the central computing device, wherein each of the plurality of printers is geographically separated from other printers of the plurality of printers;
    the plurality of printers communicating to the central computing device an ink specification available at each of the plurality of printers and a volume of ink available at each of the plurality of printers;
    the central computing selecting a printer from the plurality of printers based upon the ink specification available to the printer and the volume of ink available at the printer; and
    the central computing device providing imaging information to the printer.

2. The imaging method of claim 1, wherein the plurality of printers is selected from a larger population of printers that are part of a network of printers that communicate with the central computing device, and wherein the selection of the plurality of printers is based upon geographic location of the plurality of printers.

3. The imaging method of claim 1, wherein the imaging information comprises an image specification, an ink specification, and a substrate specification.

4. The imaging method of claim 1, wherein the imaging information is provided in a metadata file communicated by the central computing device to printer.

5. The imaging method of claim 3, wherein the imaging information comprises a waveform specification.

6. The imaging method of claim 3, wherein the image specification comprises visual graphics information, image size and image resolution.

7. The imaging method of claim 1, wherein each printer of the plurality of printers communicates its substrate availability and geographic location.

8. The imaging method of claim 3, wherein the central computing device determines the volume of ink required to form the image as a function of a pulse count required for the image specification, ink specification, and substrate specification.

9. The imaging method of claim 1, wherein a plurality of images is selected and the central computing device determining a volume of ink required to form the images.

10. The imaging method of claim 1, wherein a plurality of substrates is selected and the central computing device determining a volume of ink required to form the image on the substrates.

11. The imaging method of claim 1, wherein a plurality of images is selected and a plurality of substrates is selected and the central computing device determining a volume of ink required to form the images on the plurality of substrates.

12. The imaging method of claim 1, wherein the ink specification is for liquid inks comprising sublimation dyes.

* * * * *